United States Patent
Osminer

(10) Patent No.: US 9,467,723 B2
(45) Date of Patent: Oct. 11, 2016

(54) APPARATUS AND METHODS FOR AUTOMATED HIGHLIGHT REEL CREATION IN A CONTENT DELIVERY NETWORK

(75) Inventor: Matthew Osminer, Erie, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 88 days.

(21) Appl. No.: 13/439,683

(22) Filed: Apr. 4, 2012

(65) Prior Publication Data
US 2013/0268620 A1    Oct. 10, 2013

(51) Int. Cl.
| G06F 15/16 | (2006.01) |
| H04N 21/25 | (2011.01) |
| H04N 21/258 | (2011.01) |
| H04N 21/658 | (2011.01) |
| H04N 21/81 | (2011.01) |
| H04N 21/8549 | (2011.01) |
| G11B 27/031 | (2006.01) |
| G11B 27/32 | (2006.01) |
| G06Q 30/00 | (2012.01) |

(52) U.S. Cl.
CPC ........... *H04N 21/251* (2013.01); *G11B 27/031* (2013.01); *G11B 27/322* (2013.01); *H04N 21/25891* (2013.01); *H04N 21/6582* (2013.01); *H04N 21/8133* (2013.01); *H04N 21/8549* (2013.01)

(58) Field of Classification Search
CPC ............... H04N 21/25891; H04N 21/2668
See application file for complete search history.

(56) References Cited

U.S. PATENT DOCUMENTS 4,677,501 A   6/1987   Saltzman et al.
5,253,066 A   10/1993  Vogel
(Continued)

FOREIGN PATENT DOCUMENTS

| EP | 1 087 619 | 3/2001 |
| JP | A-2005-519365 | 6/2005 |

(Continued)

OTHER PUBLICATIONS

US 6,940,674, 09/2005, Sakamoto (withdrawn)
(Continued)

*Primary Examiner* — Abu Sholeman
*Assistant Examiner* — Maung Lwin
(74) *Attorney, Agent, or Firm* — Gazdzinski & Associates, PC

(57) ABSTRACT

Methods and apparatus for the automated creation of targeted or focused content extractions and/or compilations (e.g., highlight reels). In one embodiment, the extractions or compilations are created for use in a content delivery network. In one variant, incoming live feeds are recorded. Time-stamped metadata from sources (either internal or external) able to identify moments and events of interest is used to parse or select portions of the live feeds to generate clips related thereto. Those clips are then sent to users (including optionally their mobile devices) for viewing. In some embodiments, a recommendation engine is used to select clips matching interests of a particular user or group of users. Varied sources of metadata may be used, and networked resources may be utilized to in the implementation of internal "excitement" monitoring systems. Myriad configurations may be implemented including server or head-end based configurations, consumer premises based deployments, and/or distributed implementations.

16 Claims, 12 Drawing Sheets

(56) References Cited

U.S. PATENT DOCUMENTS

| | | |
|---|---|---|
| 5,285,272 A | 2/1994 | Bradley et al. |
| 5,335,277 A | 8/1994 | Harvey et al. |
| 5,357,276 A | 10/1994 | Banker et al. |
| 5,371,551 A | 12/1994 | Logan et al. |
| 5,410,344 A | 4/1995 | Graves et al. |
| 5,436,917 A | 7/1995 | Karasawa |
| 5,477,263 A | 12/1995 | O'Callaghan et al. |
| 5,517,257 A | 5/1996 | Dunn et al. |
| 5,528,282 A | 6/1996 | Voeten et al. |
| 5,528,284 A | 6/1996 | Iwami et al. |
| 5,534,911 A | 7/1996 | Levitan |
| 5,543,927 A | 8/1996 | Herz |
| 5,550,640 A | 8/1996 | Tsuboi et al. |
| 5,557,319 A | 9/1996 | Gurusami et al. |
| 5,579,183 A | 11/1996 | Van Gestel et al. |
| 5,619,247 A | 4/1997 | Russo |
| 5,671,386 A | 9/1997 | Blair et al. |
| 5,682,597 A | 10/1997 | Ganek et al. |
| 5,687,275 A | 11/1997 | Lane et al. |
| 5,699,360 A | 12/1997 | Nishida et al. |
| 5,708,961 A | 1/1998 | Hylton et al. |
| 5,710,970 A | 1/1998 | Walters et al. |
| 5,721,878 A | 2/1998 | Ottesen et al. |
| 5,727,113 A | 3/1998 | Shimoda |
| 5,729,280 A | 3/1998 | Inoue et al. |
| 5,729,648 A | 3/1998 | Boyce et al. |
| 5,745,837 A | 4/1998 | Fuhrmann |
| 5,748,254 A | 5/1998 | Harrison et al. |
| 5,758,257 A | 5/1998 | Herz et al. |
| 5,778,187 A | 7/1998 | Monteiro et al. |
| 5,793,971 A | 8/1998 | Fujita et al. |
| 5,794,217 A | 8/1998 | Allen |
| 5,798,785 A * | 8/1998 | Hendricks .............. H04H 20/42 348/E5.002 |
| 5,808,608 A | 9/1998 | Young et al. |
| 5,818,438 A | 10/1998 | Howe et al. |
| 5,818,510 A | 10/1998 | Cobbley et al. |
| 5,822,493 A | 10/1998 | Uehara et al. |
| 5,822,530 A | 10/1998 | Brown |
| 5,838,921 A | 11/1998 | Speeter |
| 5,850,218 A | 12/1998 | LaJoie et al. |
| 5,861,881 A | 1/1999 | Freeman et al. |
| 5,887,243 A | 3/1999 | Harvey et al. |
| 5,897,635 A | 4/1999 | Torres et al. |
| 5,915,068 A | 6/1999 | Levine |
| 5,917,538 A | 6/1999 | Asamizuya |
| 5,940,738 A | 8/1999 | Rao |
| 5,999,525 A | 12/1999 | Krishnaswamy et al. |
| 5,999,535 A | 12/1999 | Wang et al. |
| 6,005,603 A | 12/1999 | Flavin |
| 6,026,211 A | 2/2000 | Nakamura et al. |
| 6,046,760 A | 4/2000 | Jun |
| 6,047,327 A * | 4/2000 | Tso ..................... G06F 17/3087 707/E17.116 |
| 6,052,588 A | 4/2000 | Mo et al. |
| 6,055,358 A | 4/2000 | Traxlmayr |
| 6,065,050 A | 5/2000 | DeMoney |
| 6,108,002 A | 8/2000 | Ishizaki |
| 6,115,532 A | 9/2000 | Saeki |
| 6,118,922 A | 9/2000 | Van Gestel et al. |
| 6,125,397 A | 9/2000 | Yoshimura et al. |
| 6,167,432 A | 12/2000 | Jiang |
| 6,172,712 B1 | 1/2001 | Beard |
| 6,177,931 B1 | 1/2001 | Alexander et al. |
| 6,181,697 B1 | 1/2001 | Nurenberg et al. |
| 6,219,710 B1 | 4/2001 | Gray et al. |
| 6,233,389 B1 | 5/2001 | Barton et al. |
| 6,253,375 B1 | 6/2001 | Gordon et al. |
| 6,259,701 B1 | 7/2001 | Shur et al. |
| 6,314,572 B1 | 11/2001 | LaRocca et al. |
| 6,317,884 B1 | 11/2001 | Eames et al. |
| 6,324,338 B1 | 11/2001 | Wood et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,442,328 B1 | 8/2002 | Elliott et al. |
| 6,442,332 B1 | 8/2002 | Knudson et al. |
| 6,473,793 B1 | 10/2002 | Dillon et al. |
| 6,519,062 B1 | 2/2003 | Yoo |
| 6,523,696 B1 | 2/2003 | Saito et al. |
| 6,532,593 B1 | 3/2003 | Moroney |
| 6,543,053 B1 | 4/2003 | Li et al. |
| 6,546,016 B1 | 4/2003 | Gerszberg et al. |
| 6,564,381 B1 | 5/2003 | Hodge et al. |
| 6,609,253 B1 | 8/2003 | Swix et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,748,395 B1 | 6/2004 | Picker et al. |
| 6,754,904 B1 | 6/2004 | Cooper et al. |
| 6,757,906 B1 | 6/2004 | Look et al. |
| 6,769,127 B1 | 7/2004 | Bonomi et al. |
| 6,774,926 B1 | 8/2004 | Ellis et al. |
| 6,788,676 B2 | 9/2004 | Partanen et al. |
| 6,847,778 B1 | 1/2005 | Vallone et al. |
| 6,909,726 B1 | 6/2005 | Sheeran |
| 6,917,614 B1 | 7/2005 | Laubach et al. |
| 6,918,131 B1 | 7/2005 | Rautila et al. |
| 6,925,257 B2 | 8/2005 | Yoo |
| 6,931,018 B1 | 8/2005 | Fisher |
| 6,931,657 B1 | 8/2005 | Marsh |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 7,006,881 B1 | 2/2006 | Hoftberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,206,775 B2 | 4/2007 | Kaiser et al. |
| 7,207,055 B2 | 4/2007 | Hendricks et al. |
| 7,209,458 B2 | 4/2007 | Ahvonen et al. |
| 7,213,036 B2 | 5/2007 | Vidur Apparao et al. |
| 7,228,556 B2 | 6/2007 | Beach et al. |
| 7,228,656 B2 | 6/2007 | Mitchell et al. |
| 7,240,359 B1 | 7/2007 | Sie et al. |
| 7,242,960 B2 | 7/2007 | Van Rooyen |
| 7,254,608 B2 | 8/2007 | Yeager et al. |
| 7,257,106 B2 | 8/2007 | Chen et al. |
| 7,260,823 B2 | 8/2007 | Schlack et al. |
| 7,265,927 B2 | 9/2007 | Sugiyama et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 1/2008 | Shao et al. |
| 7,330,483 B1 | 2/2008 | Peters et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,762 B2 | 3/2008 | Kim |
| 7,359,375 B2 | 4/2008 | Lipsanen et al. |
| 7,363,643 B2 | 4/2008 | Drake et al. |

(56) References Cited

U.S. PATENT DOCUMENTS

| | | |
|---|---|---|
| 7,376,386 B2 | 5/2008 | Phillips et al. |
| 7,382,786 B2 | 6/2008 | Chen |
| 7,457,520 B2 | 11/2008 | Rossetti et al. |
| 7,486,869 B2 | 2/2009 | Alexander |
| 7,532,712 B2 | 5/2009 | Gonder |
| 7,548,562 B2 | 6/2009 | Ward et al. |
| 7,567,983 B2 | 7/2009 | Pickelsimer |
| 7,571,452 B2 | 8/2009 | Gutta |
| 7,592,912 B2 | 9/2009 | Hasek |
| 7,602,820 B2 | 10/2009 | Helms et al. |
| 7,609,637 B2 | 10/2009 | Doshi et al. |
| 7,624,337 B2 | 11/2009 | Sull et al. |
| 7,690,020 B2 | 3/2010 | Lebar |
| 7,693,171 B2 | 4/2010 | Gould |
| 7,721,314 B2 | 5/2010 | Sincaglia et al. |
| 7,742,074 B2 | 6/2010 | Minatogawa |
| 7,763,360 B2 | 7/2010 | Paul et al. |
| 7,809,942 B2 | 10/2010 | Baran et al. |
| 7,900,052 B2 | 3/2011 | Jonas |
| 7,916,755 B2 | 3/2011 | Hasek |
| 7,936,775 B2 | 5/2011 | Iwamura |
| 7,954,131 B2 | 5/2011 | Cholas et al. |
| 8,024,762 B2 | 9/2011 | Britt |
| 8,090,014 B2 | 1/2012 | Cheung et al. |
| 8,090,104 B2 | 1/2012 | Wajs |
| 8,099,757 B2 | 1/2012 | Riedl et al. |
| 8,151,294 B2 | 4/2012 | Carlucci et al. |
| 8,170,065 B2 | 5/2012 | Hasek |
| 8,181,209 B2 | 5/2012 | Hasek et al. |
| 8,214,256 B2 | 7/2012 | Riedl et al. |
| 8,280,982 B2 | 10/2012 | La Joie et al. |
| 8,281,352 B2 | 10/2012 | Brooks et al. |
| 8,341,242 B2 | 12/2012 | Dillon et al. |
| 8,347,341 B2 | 1/2013 | Markley et al. |
| 8,396,055 B2 | 3/2013 | Patel et al. |
| 8,429,702 B2 | 4/2013 | Yasrebi et al. |
| 8,516,529 B2 | 8/2013 | Lajoie et al. |
| 8,520,850 B2 | 8/2013 | Helms et al. |
| 8,549,013 B1 * | 10/2013 | Sarma et al. ............... 707/748 |
| 8,561,116 B2 | 10/2013 | Hasek |
| 9,021,566 B1 | 4/2015 | Panayotopoulos et al. |
| 9,215,423 B2 | 12/2015 | Kimble et al. |
| 2001/0004768 A1 | 6/2001 | Hodge et al. |
| 2001/0047516 A1 | 11/2001 | Swain et al. |
| 2001/0050945 A1 | 12/2001 | Lindsey |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0042914 A1 | 4/2002 | Walker et al. |
| 2002/0053076 A1 | 5/2002 | Landesmann |
| 2002/0056087 A1 | 5/2002 | Berezoxski et al. |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 | 6/2002 | Gill et al. |
| 2002/0087995 A1 | 7/2002 | Pedlow |
| 2002/0144267 A1 | 10/2002 | Gutta et al. |
| 2002/0147771 A1 | 10/2002 | Traversat et al. |
| 2002/0152091 A1 | 10/2002 | Nagaoka |
| 2002/0152299 A1 | 10/2002 | Traversat et al. |
| 2002/0174430 A1 | 11/2002 | Ellis et al. |
| 2002/0174433 A1 | 11/2002 | Baumgartner et al. |
| 2002/0188744 A1 | 12/2002 | Mani |
| 2002/0188869 A1 | 12/2002 | Patrick et al. |
| 2002/0191950 A1 | 12/2002 | Wang |
| 2003/0005453 A1 | 1/2003 | Rodrigues et al. |
| 2003/0005457 A1 | 1/2003 | Faibish et al. |
| 2003/0028451 A1 | 2/2003 | Ananian |
| 2003/0056217 A1 | 3/2003 | Brooks et al. |
| 2003/0086422 A1 | 5/2003 | Klinker et al. |
| 2003/0093790 A1 | 5/2003 | Logan et al. |
| 2003/0093794 A1 | 5/2003 | Thomas et al. |
| 2003/0115267 A1 | 6/2003 | Hinton et al. |
| 2003/0123465 A1 | 7/2003 | Donahue |
| 2003/0163443 A1 | 8/2003 | Wang |
| 2003/0165241 A1 | 9/2003 | Fransdonk |
| 2003/0166401 A1 | 9/2003 | Combes et al. |
| 2003/0188317 A1 | 10/2003 | Liew et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0015986 A1 | 1/2004 | Carver et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0083177 A1 | 4/2004 | Chen et al. |
| 2004/0117254 A1 | 6/2004 | Nemirofsky |
| 2004/0133923 A1 | 7/2004 | Watson et al. |
| 2004/0137918 A1 | 7/2004 | Varonen et al. |
| 2004/0166832 A1 | 8/2004 | Portman et al. |
| 2004/0230994 A1 | 11/2004 | Urdang et al. |
| 2004/0250273 A1 | 12/2004 | Swix et al. |
| 2004/0268398 A1 | 12/2004 | Fano et al. |
| 2005/0002638 A1 | 1/2005 | Putterman et al. |
| 2005/0005308 A1 | 1/2005 | Logan et al. |
| 2005/0034171 A1 | 2/2005 | Benya |
| 2005/0049886 A1 | 3/2005 | Grannan et al. |
| 2005/0050579 A1 | 3/2005 | Dietz et al. |
| 2005/0055220 A1 | 3/2005 | Lee et al. |
| 2005/0055729 A1 | 3/2005 | Atad et al. |
| 2005/0086334 A1 | 4/2005 | Aaltonen et al. |
| 2005/0086683 A1 | 4/2005 | Meyerson et al. |
| 2005/0097599 A1 | 5/2005 | Plotnick et al. |
| 2005/0108763 A1 | 5/2005 | Baran et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0289618 A1 | 12/2005 | Hardin |
| 2006/0020786 A1 | 1/2006 | Helms |
| 2006/0021004 A1 | 1/2006 | Moran et al. |
| 2006/0041915 A1 | 2/2006 | Dimitrova et al. |
| 2006/0047957 A1 | 3/2006 | Helms et al. |
| 2006/0059532 A1 | 3/2006 | Dugan et al. |
| 2006/0090186 A1 | 4/2006 | Santangelo et al. |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1 | 6/2006 | Rooyen et al. |
| 2006/0130107 A1 | 6/2006 | Gonder |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0139379 A1 | 6/2006 | Toma et al. |
| 2006/0149850 A1 | 7/2006 | Bowman |
| 2006/0156392 A1 | 7/2006 | Baugher |
| 2006/0161635 A1 | 7/2006 | Lamkin et al. |
| 2006/0165082 A1 | 7/2006 | Pfeffer |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218604 A1 | 9/2006 | Riedl et al. |
| 2006/0248553 A1 | 11/2006 | Mikkelson et al. |
| 2006/0259927 A1 | 11/2006 | Acharya et al. |
| 2006/0288366 A1 | 12/2006 | Boylan et al. |
| 2006/0291506 A1 | 12/2006 | Cain |
| 2007/0014293 A1 | 1/2007 | Filsfils et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0025372 A1 | 2/2007 | Brenes et al. |
| 2007/0033531 A1 | 2/2007 | Marsh et al. |
| 2007/0049245 A1 | 3/2007 | Lipman |
| 2007/0053513 A1 | 3/2007 | Hoffberg |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0094691 A1 | 4/2007 | Gazdzinski |
| 2007/0118848 A1 | 5/2007 | Schwesinger et al. |
| 2007/0121578 A1 | 5/2007 | Annadata et al. |
| 2007/0121678 A1 | 5/2007 | Brooks |

(56) References Cited

U.S. PATENT DOCUMENTS

| | | |
|---|---|---|
| 2007/0124488 A1 | 5/2007 | Baum et al. |
| 2007/0136777 A1 | 6/2007 | Hasek et al. |
| 2007/0153820 A1 | 7/2007 | Gould |
| 2007/0154041 A1 | 7/2007 | Beauchamp |
| 2007/0180230 A1 | 8/2007 | Cortez |
| 2007/0192103 A1* | 8/2007 | Sato et al. .................... 704/253 |
| 2007/0204300 A1 | 8/2007 | Markley |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0226365 A1 | 9/2007 | Hildreth et al. |
| 2007/0250880 A1 | 10/2007 | Hainline |
| 2007/0261116 A1 | 11/2007 | Prafullchandra et al. |
| 2007/0276925 A1 | 11/2007 | La Joie |
| 2007/0276926 A1 | 11/2007 | La Joie et al. |
| 2007/0294717 A1 | 12/2007 | Hill et al. |
| 2007/0294738 A1 | 12/2007 | Kuo et al. |
| 2007/0299728 A1 | 12/2007 | Nemirofsky |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0085750 A1 | 4/2008 | Yoshizawa |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092181 A1 | 4/2008 | Britt et al. |
| 2008/0098212 A1 | 4/2008 | Helms et al. |
| 2008/0098241 A1 | 4/2008 | Cheshire |
| 2008/0098450 A1 | 4/2008 | Wu et al. |
| 2008/0109853 A1 | 5/2008 | Einarsson et al. |
| 2008/0112405 A1 | 5/2008 | Cholas |
| 2008/0133551 A1 | 6/2008 | Wensley et al. |
| 2008/0134043 A1* | 6/2008 | Georgis ............ G06F 17/30035 715/733 |
| 2008/0137541 A1 | 6/2008 | Agarwal et al. |
| 2008/0155059 A1 | 6/2008 | Hardin |
| 2008/0162353 A1 | 7/2008 | Tom et al. |
| 2008/0168487 A1 | 7/2008 | Chow et al. |
| 2008/0184344 A1 | 7/2008 | Hernacki et al. |
| 2008/0189617 A1 | 8/2008 | Covell et al. |
| 2008/0192820 A1 | 8/2008 | Brooks |
| 2008/0200154 A1 | 8/2008 | Maharajh et al. |
| 2008/0201736 A1 | 8/2008 | Gordon et al. |
| 2008/0215755 A1 | 9/2008 | Farber et al. |
| 2008/0222684 A1 | 9/2008 | Mukraj et al. |
| 2008/0235746 A1 | 9/2008 | Peters et al. |
| 2008/0256615 A1 | 10/2008 | Schlacht et al. |
| 2008/0273591 A1 | 11/2008 | Brooks |
| 2008/0282299 A1 | 11/2008 | Koat et al. |
| 2008/0320523 A1 | 12/2008 | Morris et al. |
| 2008/0320528 A1 | 12/2008 | Kim et al. |
| 2009/0006211 A1 | 1/2009 | Perry et al. |
| 2009/0030802 A1 | 1/2009 | Plotnick et al. |
| 2009/0031335 A1 | 1/2009 | Hendricks et al. |
| 2009/0083279 A1 | 3/2009 | Hasek |
| 2009/0083813 A1 | 3/2009 | Dolce et al. |
| 2009/0094347 A1 | 4/2009 | Ting et al. |
| 2009/0098861 A1 | 4/2009 | Kalliola et al. |
| 2009/0100459 A1 | 4/2009 | Riedl |
| 2009/0141696 A1 | 6/2009 | Chou et al. |
| 2009/0150917 A1 | 6/2009 | Huffman et al. |
| 2009/0158311 A1 | 6/2009 | Hon et al. |
| 2009/0172776 A1 | 7/2009 | Makagon et al. |
| 2009/0185576 A1 | 7/2009 | Kisel et al. |
| 2009/0187939 A1 | 7/2009 | Lajoie |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas |
| 2009/0225760 A1 | 9/2009 | Foti |
| 2009/0228941 A1 | 9/2009 | Russell et al. |
| 2009/0248794 A1 | 10/2009 | Helms et al. |
| 2009/0282241 A1 | 11/2009 | Prafullchandra et al. |
| 2009/0293101 A1 | 11/2009 | Carter et al. |
| 2010/0027560 A1 | 2/2010 | Yang et al. |
| 2010/0030578 A1 | 2/2010 | Siddique et al. |
| 2010/0042478 A1 | 2/2010 | Reisman |
| 2010/0043030 A1 | 2/2010 | White |
| 2010/0083329 A1 | 4/2010 | Joyce et al. |
| 2010/0106846 A1 | 4/2010 | Noldus et al. |
| 2010/0115091 A1 | 5/2010 | Park et al. |
| 2010/0115540 A1 | 5/2010 | Fan et al. |
| 2010/0122274 A1 | 5/2010 | Gillies |
| 2010/0125658 A1 | 5/2010 | Strasters |
| 2010/0131973 A1 | 5/2010 | Dillon et al. |
| 2010/0132003 A1 | 5/2010 | Bennett et al. |
| 2010/0138900 A1 | 6/2010 | Peterka et al. |
| 2010/0169977 A1 | 7/2010 | Dasher et al. |
| 2010/0186029 A1 | 7/2010 | Kim et al. |
| 2010/0198655 A1* | 8/2010 | Ketchum ............... G06Q 20/10 705/14.58 |
| 2010/0217613 A1 | 8/2010 | Kelly et al. |
| 2010/0219613 A1 | 9/2010 | Zaloom et al. |
| 2010/0251304 A1* | 9/2010 | Donoghue ......... H04N 5/44543 725/46 |
| 2010/0251305 A1* | 9/2010 | Kimble et al. .................. 725/46 |
| 2010/0262999 A1 | 10/2010 | Curran |
| 2010/0269144 A1 | 10/2010 | Forsman et al. |
| 2010/0287588 A1* | 11/2010 | Cox ................... H04N 5/44543 725/40 |
| 2010/0287609 A1 | 11/2010 | Gonzalez et al. |
| 2010/0293494 A1* | 11/2010 | Schmidt ....................... 715/772 |
| 2010/0312826 A1 | 12/2010 | Sarosi et al. |
| 2010/0313225 A1 | 12/2010 | Cholas et al. |
| 2010/0325547 A1 | 12/2010 | Keng et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0055866 A1 | 3/2011 | Piepenbrink et al. |
| 2011/0071841 A1 | 3/2011 | Fomenko et al. |
| 2011/0090898 A1 | 4/2011 | Patel et al. |
| 2011/0093900 A1 | 4/2011 | Patel et al. |
| 2011/0103374 A1 | 5/2011 | Lajoie et al. |
| 2011/0107364 A1 | 5/2011 | LaJoie et al. |
| 2011/0107379 A1 | 5/2011 | Lajoie et al. |
| 2011/0126246 A1 | 5/2011 | Thomas et al. |
| 2011/0138064 A1 | 6/2011 | Rieger et al. |
| 2011/0145049 A1 | 6/2011 | Hertel et al. |
| 2011/0154383 A1 | 6/2011 | Hao et al. |
| 2011/0173053 A1 | 7/2011 | Kassaei |
| 2011/0173095 A1 | 7/2011 | Kassaei et al. |
| 2011/0212756 A1* | 9/2011 | Packard et al. .................... 463/1 |
| 2011/0213688 A1 | 9/2011 | Santos et al. |
| 2011/0219229 A1 | 9/2011 | Cholas et al. |
| 2011/0231660 A1 | 9/2011 | Kanungo |
| 2011/0246616 A1 | 10/2011 | Ronca et al. |
| 2011/0258049 A1 | 10/2011 | Ramer et al. |
| 2011/0264530 A1 | 10/2011 | Santangelo et al. |
| 2011/0265116 A1 | 10/2011 | Stern et al. |
| 2011/0276881 A1 | 11/2011 | Keng et al. |
| 2011/0302624 A1 | 12/2011 | Chen et al. |
| 2012/0008786 A1 | 1/2012 | Cronk et al. |
| 2012/0011567 A1 | 1/2012 | Cronk et al. |
| 2012/0076015 A1 | 3/2012 | Pfeffer |
| 2012/0079523 A1 | 3/2012 | Trimper et al. |
| 2012/0089699 A1 | 4/2012 | Cholas et al. |
| 2012/0124149 A1* | 5/2012 | Gross ................ G06F 17/30873 709/206 |
| 2012/0137332 A1 | 5/2012 | Kumar |
| 2012/0151077 A1 | 6/2012 | Finster |
| 2012/0167132 A1 | 6/2012 | Mathews et al. |
| 2012/0170544 A1 | 7/2012 | Cheng et al. |
| 2012/0170741 A1 | 7/2012 | Chen et al. |
| 2012/0173746 A1 | 7/2012 | Salinger et al. |
| 2012/0185693 A1 | 7/2012 | Chen et al. |
| 2012/0191844 A1* | 7/2012 | Boyns ................ G06Q 30/0282 709/224 |
| 2012/0215903 A1* | 8/2012 | Fleischman ........ G06Q 30/0201 709/224 |
| 2012/0246462 A1 | 9/2012 | Moroney et al. |
| 2012/0284804 A1 | 11/2012 | Lindquist et al. |
| 2012/0324552 A1 | 12/2012 | Padala et al. |
| 2013/0031578 A1 | 1/2013 | Zhu et al. |
| 2013/0039338 A1* | 2/2013 | Suzuki et al. ................. 370/331 |

(56) References Cited

U.S. PATENT DOCUMENTS

| | | |
|---|---|---|
| 2013/0046849 A1 | 2/2013 | Wolf et al. |
| 2013/0073400 A1* | 3/2013 | Heath .................. G06Q 30/02 705/14.73 |
| 2013/0097647 A1 | 4/2013 | Brooks et al. |
| 2013/0117692 A1 | 5/2013 | Padmanabhan et al. |
| 2013/0132986 A1 | 5/2013 | Mack et al. |
| 2013/0133010 A1 | 5/2013 | Chen et al. |
| 2013/0166906 A1 | 6/2013 | Swaminathan et al. |
| 2013/0174271 A1 | 7/2013 | Handal et al. |
| 2013/0219178 A1 | 8/2013 | Xiques et al. |
| 2013/0227283 A1 | 8/2013 | Williamson et al. |
| 2013/0227284 A1 | 8/2013 | Pfeffer et al. |
| 2014/0012843 A1 | 1/2014 | Soon-Shiong |
| 2014/0074855 A1 | 3/2014 | Zhao et al. |
| 2014/0245341 A1 | 8/2014 | Mack et al. |
| 2014/0259182 A1 | 9/2014 | Mershon |

FOREIGN PATENT DOCUMENTS

| | | |
|---|---|---|
| JP | A-2005-519501 | 6/2005 |
| JP | A-2005-339093 | 12/2005 |
| JP | A-2008-015936 | 1/2008 |
| JP | A-2009-211632 | 9/2009 |
| JP | A-2010-502109 | 1/2010 |
| JP | A-2010-079902 | 4/2010 |
| JP | A-2012-505436 | 3/2012 |
| JP | A-2012-523614 | 10/2012 |
| WO | WO 00/11871 | 3/2000 |
| WO | WO 00/52928 | 9/2000 |
| WO | WO 01/10125 | 2/2001 |
| WO | WO 01/56285 | 2/2001 |
| WO | WO 01/95621 | 12/2001 |
| WO | WO-0195610 A1 | 12/2001 |
| WO | WO 2005/015422 | 2/2005 |
| WO | WO 2005031524 | 4/2005 |
| WO | WO 2007/060451 | 5/2007 |
| WO | WO-2011035443 A1 | 3/2011 |
| WO | WO-2011053858 A1 | 5/2011 |
| WO | WO-2012021245 A1 | 2/2012 |

OTHER PUBLICATIONS

Schonfeld, "Thuuz tells sports fans if a game is worth watching", Oct. 7, 2010, TC News from http://techcrunch.com/2010/10/07/thuuz, 2 pages.*

*Scaling of the distribution of fluctuations of financial market indices* by P. Gopikrishnan et al. Physical Review E. vol. 60 No. 5., Nov. 1999.

Roy Furchgott, "Don't want people to control their T.V.s?", The New York Times, Aug. 24, 2000, Section G, p. 1, col. 2, Circuits, 2000 The New York Times Company.

"PVR copyright concerns raised", Audio Week, Aug. 23, 1999, section: This Week's News, 1999 Warren Publishing, Inc.

Dale Buss, "Ultra TV", Brandmarketing, Sep. 1999, vol. VI, No. 9, p. 74, ISSN 1091-6962, 1999 Responsive Database Services, Inc. Business and Industry; 1999 Fairchild Publications.

Brian Lowry, "Television, as you like it; Today's gadgetry is smart enough to let viewers choose camera angles, or kick back and rewind as the action unfolds live. Watch it, and it watches back", Los Angeles Times, Feb. 13, 2000, section: Calendar, p. 8, Calendar Desk, 2000 Times Mirror Company.

Peter Thal Larsen, "Inside Track: TV viewers can box clever: Technology Video Recorders: personal video reorders will be a godsend for viewers. But what about the schedulers", Financial Times London Ed., Jun. 23, 2000, p. 18, ISSN 0307-1766, 2000 Responsive Database Services, Inc. Business and Industry; 2000 Financial Times Ltd.

Patricia Sabga; Charles Molineaux, "TiVo—CEO, CNNfn", transcript # 00090110FN-107 interview Michael Ramsay, The N.E.W. Show, Sep. 1, 2000, Fri. 5:18 p.m. EST, 2000 Cable News Network.

Mary Kathleen Flynn; Steve Young, "Interactive TV, CNNFn", transcipt #00081407FN-111 interview Josh Bernoff, Digital Jam, Aug. 14, 2000, Mon. 8:08 p.m. EST, 2000 Cable News Network.

"More 'convergence' digital video recorders emerge", Video Week, Jun. 19, 2000, section: This Week's News, 2000 Warren Publishing, Inc.

"TiVo and replay sign cable deals to boost PVR distribution", Warren's Cable Regulation Monitor, Aug. 21, 2000, section: This Week's News, 2000 Warren Publishing, Inc.

"Future VOD role of studios vs. other companies debated", Video Week, Apr. 10, 2000, section: This Week's News, 2000 Warren Publishing, Inc.

Raymond Snoddy, "The TiVo—T.V.'s nemesis?", Times Newspapers Ltd., Sep. 1, 2000, section: Features, 2000 Times Newspapers Limited (the Times London).

Marc Gunther; Irene Gashurov, "When technology attacks!; Your T.V. is looking weird. Network executives are getting flustered. Viewing choices are exploding. That's what happens . . . ", Fortune, Mar. 6, 2000, section: Features/Television, p. 152, 2000 Time Inc.

"Independent study shows TiVo service increases enjoyment and changes people's attitudes towards T.V.", PR Newswire, May 2, 2000, 2000 FT Asia Intelligence Wire; 2000 PR Newswire.

Kale, RFC 1180 "A TCP/IP tutorial", Jan. 1991, Spider Systems Limited, Section 4 "ARP".

Duso et al, Operating System Support for a Video-On-Demand File Service, Digital Equipment Corporation, p. 4 ("CMFAP"), (1995).

UTF-32, IBM, retrieved from http://publib.boulder.ibm.com/infocenter/iseries/v5r3/index.jsp?topic=%2Fnls%2Frbagsutf32.htm.on Aug. 28, 2013.

Security Assertion Markup language (SAML) Specification (Version 2.0 released in 2005), as SAML Core: S. Cantor et al. Assertions and Protocols for the OASIS Security Assertion Markup Language (SAML) V2.0. OASIS Standard, Mar. 2005. Document ID saml-core-2.0-os (http://docs.oasis-open.org/security/saml/v2.0/saml-core-2.0-os.pdf).

SAML Binding: S. Cantor et al. Bindings for the OASIS Security Assertion Markup Language (SAML) V2.0. OASIS Standard, Mar. 2005. Document ID saml-bindings-2.0-os (http://docs.oasis-open.org/security/saml/v2.0/saml-bindings-2.0-os.pdf).

Enhanced TV Binary Interchange, Format 1.0 OC-SP-ETV-B1F1.0-104-070921 Date: Sep. 21, 2007, 420 pages.

"Select a Channel to start watching", Videophiles: Curate your own online video channel with expressive easy to use tools; © 2014 Redux, Inc. All rights reserved; http://www.redux.com/; 2 pages.

Extended European Search Report for Application No. EP13155950, mailed on Jun. 14, 2013, 6 pages.

American national Standard. ANSI/SCTE 35 2012. Digital Program Insertion Cueing Message for Cable, by Society of Cable Telecommunication Engineers. 2012.

Apple Inc, The apparatus and methods of H1TP Live Streaming Overview, Apr. 1, 2011.

Open Cable Specifications Alternate Content Real-Time Event Signaling and Management API by Cable Television Laboratories. Inc. 2012.

SCTE Standards Document ANSUSCTE 118-2 2007 entitled Program-Specific Ad Insertion—Content Provider to Traffic Communication Applications Data Model.

SCTE Standards Document ANSUSCTE 130-1 2008 entitled Digital Progra section Advertising Systems Interfaces.

Zarnbell °T he Apparatus and Methods of HS Smooth Streaming Technical Overview, Mar. 2009.

* cited by examiner

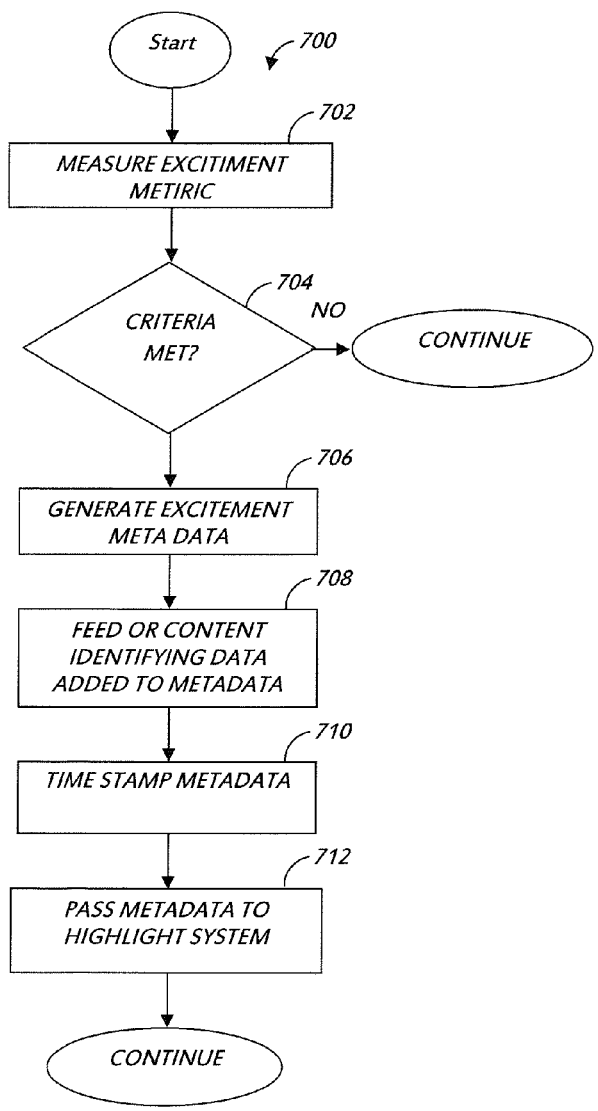
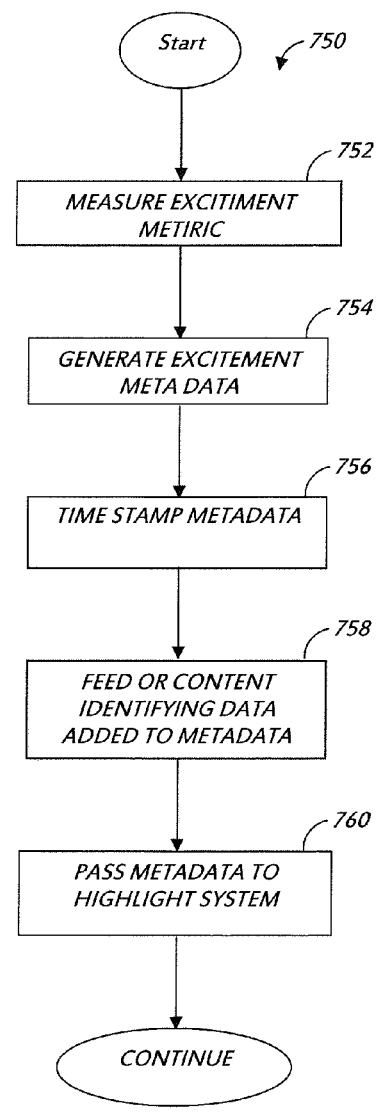
FIG. 7a
FIG. 7b

APPARATUS AND METHODS FOR AUTOMATED HIGHLIGHT REEL CREATION IN A CONTENT DELIVERY NETWORK

RELATED APPLICATIONS

This application is related to commonly owned U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE", U.S. patent application Ser. No. 12/414,554 filed Mar. 30, 2009 and entitled "PERSONAL MEDIA CHANNEL APPARATUS AND METHODS", U.S. patent application Ser. No. 12/414,576 filed Mar. 30, 2009, entitled "RECOMMENDATION ENGINE APPARATUS AND METHODS", and issued as U.S. Pat. No. 9,215,423 on Dec. 15, 2015, U.S. patent application Ser. No. 13/403,802 filed Feb. 23, 2012 and entitled "APPARATUS AND METHODS FOR PROVIDING CONTENT TO AN IP-ENABLED DEVICE IN A CONTENT DISTRIBUTION NETWORK", U.S. patent application Ser. No. 13/403,814 filed Feb. 23, 2012 "APPARATUS AND METHODS FOR CONTENT DISTRIBUTION TO PACKET-ENABLED DEVICES VIA A NETWORK BRIDGE", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data and content distribution networks. More specifically, the present invention relates in one exemplary aspect to methods and apparatus for automated creation of targeted or focused content extractions and/or compilations (e.g., highlight reel creation).

2. Description of Related Technology

The manual aggregation of highlights or other video shorts associated with various events or content elements (e.g., sports events, news, politics, reality television, etc.) into a series for quick review or montage is well known in the art. Such a manually composed series can be used to summarize the events of note from a past period of time. These series are common in sports broadcasts such as "Sportscenter®" on ESPN®, or for instance in "year in review" type pieces offered by news organizations at the end of a year, decade, etc., Typically, these collections of video shorts are used to inform viewers of events occurring earlier in the day, previous day, previous year, etc.

In the particular context of professional football, NFL (National Football League) RedZone offers game-day highlights and touchdowns on Sunday afternoons. Specifically, NFL RedZone promises to show every touchdown from every game, as well as other highlights. In addition, the service also presents viewers with a live broadcast whenever a team reaches the "red zone" (inside the defender's 20 yard line) of the opposing team. However, this service only applies to football played in the NFL, and the only definable metric the service relies upon is the distance to the goal.

Further, services like NFL Sunday Ticket™ offer wide ranging access to a specific set of content (i.e., NFL football games being played on any given Sunday). However, such services fail to identify which of the available content may be of particular interest to a user. Thus, a user is given access to more content that can be consumed (multiple aired games may be played simultaneously) without guidance as to the optimal content to view. Again, this system only applies to football games played in the NFL.

News services also create their own compilations or montages, such as to fit within a specified time slot in a news broadcast. Again, such compilations are manually created, and based on selection and placement and editing by one or more humans. However, there is an inherent delay associated with human identification of such exciting clips. Thus, moments of excitement are often missed by content consumers with interest in experiencing such content live or in near-real-time.

Further, it is impractical for an individual content provider to maintain the staffing necessary to monitor all incoming content from all of its content sources at all times for excitement. In addition, even more staff would be needed to tailor collections or series of these clips to the interests and viewing desires of individual subscribers.

Thus, methods and architectures for automated means of identifying content of interest are needed to overcome these impracticalities.

SUMMARY OF THE INVENTION

The present invention provides, inter cilia, apparatus and methods for substantially automated creation of targeted or focused content extractions and/or compilations (e.g., highlight reels).

In a first aspect of the invention, a method for identification of exciting content in a content delivery network is disclosed. In one embodiment, the method includes: receiving metadata from one or more sources, comparing the metadata to data related to a plurality of available content, and based at least in part on the comparison, identifying individual ones of the plurality of available content related to the metadata. In one variant, the metadata includes information indentifying an exciting event.

In a second aspect of the invention, a method for identification of exciting content in a content delivery network is disclosed. In one embodiment, the method includes measuring an excitement metric, generating metadata based on results from the act of measuring, adding time data associated with the act of measuring to the metadata, and adding, to the metadata, information enabling identification of one or more of (a) a particular one of a plurality of content, and (b) a content source.

In a third aspect of the invention, a content server apparatus operative to generate content having a particular attribute for delivery over a content distribution network is disclosed. In one embodiment the apparatus includes a storage device, a plurality of interfaces, and a processing entity in data communication with the plurality of interfaces and the storage device. The plurality of interfaces is configured to receive one or more feeds from one or more content sources; receive metadata from an identification source, the identification source configured to identify content having the particular attribute; and transmit a content stream to a target device.

In one variant, the processing entity is in one variant configured to run an application thereon configured to record a portion of the one or more feeds, store the portion on the storage device, compare time data present within the metadata to a time associated with the recorded portion, based on the comparison, associate the metadata with the recorded portion, evaluate at least one criterion based at least in part on the associated metadata, and if the evaluation indicates that the one or more criterion is/are met, add the recorded portion to the content stream.

In a fourth aspect of the invention, a mobile device enabled for receipt and management of exciting content is disclosed. In one embodiment the device includes a user interface configured to: (a) accept input from a user identifying an excitement level threshold, (b) present a list containing a plurality content with an excitement level above the threshold, (c) allow the user to browse the list, and (d) receive from the user a request for a particular one of the plurality of content, and a wireless interface configured to transmit the user request to a content server apparatus.

In a fifth aspect of the invention, an apparatus for generation of highlight reels in a content delivery network is disclosed. In one embodiment, the apparatus includes one or more interfaces for receiving metadata from one or more sources, one or more interfaces for receiving content from one or more feeds, and a content server entity with a processing unit associated therewith, the processing unit in data communication with at least one storage device, the processing unit configured to run a computer program thereon. In one variant, the computer program is configured to, when executed: (a) record at least one content element received over the one or more feeds, (b) store the at least one recorded feed on the storage device, (c) identify metadata related to the at least one recorded feed, the identified metadata having been received over at least one of the one or more sources, (d) compare the metadata to information related to the at least one recorded feed, and (e) based at least in part on the comparison, cause provision of at least of portion of the at least one recorded feed at least one client device of the network. The metadata includes data related to an occurrence of an exciting event.

In a sixth aspect of the invention, a non-transitory computer readable apparatus configured to store a computer program thereon is disclosed. In one embodiment, the computer program includes a plurality of instructions configured to, when executed: measure an excitement metric, generate metadata from a value associated with the measurement, add time data to the metadata, and compare the value to a set of criteria. In one variant, the set of criteria includes at least one threshold value.

In a seventh aspect of the invention, a method for identifying content is disclosed. In one embodiment, the content is exciting content, and the identification is performed using social media by at least: monitoring user posts, translating the user posts into machine readable data, developing an aggregate opinion from the machine readable data, and generating metadata from the aggregate opinion. The aggregate opinion is related to interest expressed, within the user posts, for an individual one of a plurality of available content.

In an eighth aspect of the invention, a system for substantially automated creation of targeted or focused content extractions and/or compilations is disclosed.

In a further aspect of the disclosure, a method for identification of exciting content in a content delivery network is disclosed. In one embodiment, the method includes: (i) measuring, by a first server, an excitement metric exhibited by a plurality of viewers for at least a first portion of an event; (ii) in response to determining that the excitement metric indicates an excitement level of the first portion of the event as meeting or exceeding a predetermined threshold: (a) generating metadata describing the event; (b) associating the metadata to a recorded version of the first portion of the event; (c) comparing the associated metadata to at least user preferences of at least one user; and (d) classifying, based at least in part on the comparing, the recorded version of the first portion into one or more classifications; and (iii) generating a playlist comprising the recorded version of the first portion and recorded versions of at least one of: (a) other portions of the event, or (b) portions of different events.

In one variant, the respective excitement levels of the other portions of the event and the portions of different events are indicated as meeting or exceeding the predetermined threshold. In another variant, the recorded versions of other portions of the event and the portions of different events share the one or more classifications with the recorded version of the first portion.

In a further aspect of the disclosure, a content server apparatus operative to generate content having a particular attribute is disclosed. In one embodiment, the apparatus includes: (i) a storage device; (ii) at least one interfaces configured to receive one or more feeds from one or more content sources; and (iii) a processing entity in data communication with the plurality of interfaces and the storage device.

In one variant, the processing entity is configured to run an application thereon. In one implementation, the application includes a plurality of instructions configured to, when executed: (i) monitor an excitement metric associated with one or more streams currently being delivered to a target device, where the excitement metric is exhibited by a plurality of viewers; (ii) record a portion of said one or more feeds; (iii) store the portion on said storage device; (iv) compare time data present within metadata corresponding to a level of excitement to a time associated with the recorded portion; (v) based on the comparison, associate the metadata corresponding to the level of excitement with the recorded portion of the one or more feeds; (vi) determine, based on the monitored excitement metric, whether an excitement level threshold is met for the recorded portion of the one or more feeds; (vii) in response to (a) a first determination that the excitement metric indicates that the one or more streams is below the excitement level threshold and (b) a second determination that the excitement level threshold is met for the recorded portion of the one or more feeds, cause the target device to display the recorded portion of the one or more feeds; and (viii) in response to a third determination that the excitement metric indicates that the one or more streams is at or above the excitement level threshold, present the target device with an on-screen display option.

In another implementation, the on-screen display option configured to allow the target device to switch from the display of the recorded portion of the one or more feeds to the display of the one or more streams.

These and other aspects of the invention shall become apparent when considered in light of the disclosure provided herein.

BRIEF DESCRIPTION OF THE DRAWINGS

FIG. 7a is a logical flow diagram illustrating an exemplary method for the generation on collection of excitement metadata according to the present invention.

FIG. 7b is a logical flow diagram illustrating another embodiment of the method for the generation on collection of excitement metadata according to the present invention.

Figure 1:
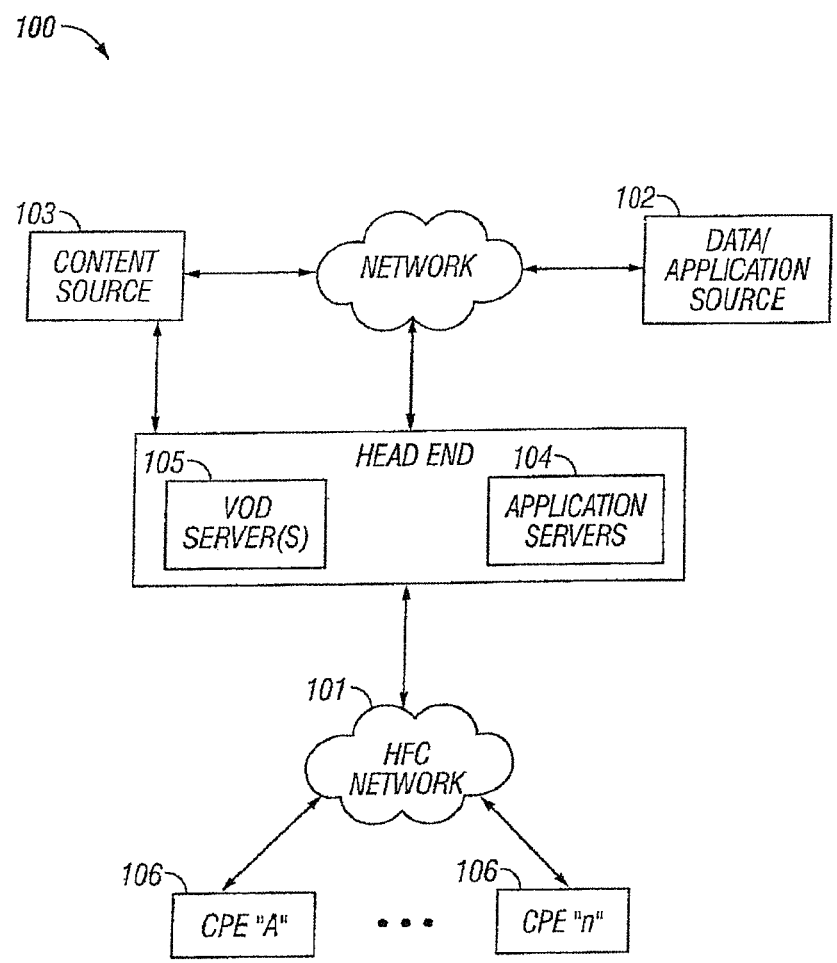
FIG. 1 is a functional block diagram illustrating an exemplary hybrid fiber/coax (HFC) cable network configuration useful with the present invention.

All Figures© Copyright 2011-2012 Time Warner Cable, Inc. All rights reserved.

DETAILED DESCRIPTION OF THE INVENTION

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, MPEG-4 Part 2, MPEG-4 Part 10, etc.), Real (RealVideo, etc.), AC-3 (audio), DiVX, XViD/ViDX, Windows Media Video (e.g., WMV 7, 8, or 9), ATI Video codec, H.263, H.264, Sorenson Spark, FFmpeg, 3ivx, x264, VP6, VP6-E, VP6-S, VP7, Sorenson 3, Theora, Cinepack, Huffyuv, Lagarith, SheerVideo, Mobiclip or VC-1 (SMPTE standard 421 M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers, as well as client devices.

As used herein, the term "display" means any type of device adapted to display information, including without limitation: CRTs, LCDs, TFTs, plasma displays, LEDs, incandescent and fluorescent devices. Display devices may also include less dynamic rendering devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. Multiple regional headends may be in the same or different cities.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CSC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, fiber networks (e.g., FTTH, Fiber-to-the-curb or FTTC, etc.), satellite networks, telco networks, and data networks (including MANs, WANs, LANs, WLANs, internets, and intranets).

As used herein, the term "network interface" refers to any signal, data, or software interface with a component, network or process including, without limitation, those of the Firewire (e.g., FW400, FW800, etc.), USB (e.g., USB 2.0 or 3.0), Ethernet (e.g., 10/100, 10/100/1000 (Gigabit Ethernet), 10-Gig-E, etc.), Thunderbolt, MoCA, Serial ATA (e.g., SATA, e-SATA, SATAII), Ultra-ATA/DMA, Coaxsys (e.g., TVnet™), radio frequency tuner (e.g., in-band or out-of-band, cable modem, etc.), Wi-Fi (e.g., 802.11a,b,g,n,v), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

Overview

In one salient aspect, the present invention discloses methods and apparatus for the automated creation of targeted or focused content extractions and/or compilations (e.g., highlight reels). In one embodiment, the extractions or compilations are created for use in a managed content delivery network such as a cable or satellite television network. In one variant, incoming live feeds are recorded. Time-stamped metadata from sources (either internal or external) able to identify moments and/or "events" of interest is used to parse or select portions of the live feeds to generate clips related thereto. Those clips are then sent to users (including optionally their mobile devices) for viewing. In some embodiments, a recommendation engine is used to select clips matching interests of a particular user or group of users.

Varied sources of metadata may be used consistent with the invention, and networked resources may be utilized to in the implementation of internal "excitement" or other types of monitoring systems. Myriad configurations may be implemented including server or head-end based configurations, consumer premises based deployments, and/or distributed implementations.

Further, clips may be selected, recommended, and/or provisioned to mobile devices (e.g. cell phones, smart-phones, tablet computers, etc.) over wired or wireless interfaces.

Service agreements may allow access to clips of limited duration, or expanded agreements may allow access to all material recommended by a given excitement data source.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber/coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise (including e.g., managed satellite or hybrid fiber/copper (HFCu) networks, unmanaged networks such as the Internet or WLANs or PANs, etc.), the following therefore being merely exemplary in nature. It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while exemplary embodiments are described primarily in the context of a hybrid fiber/conductor (e.g., cable) system with legacy 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Other features and advantages of the present invention will immediately be recognized by persons of ordinary skill in the art given the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
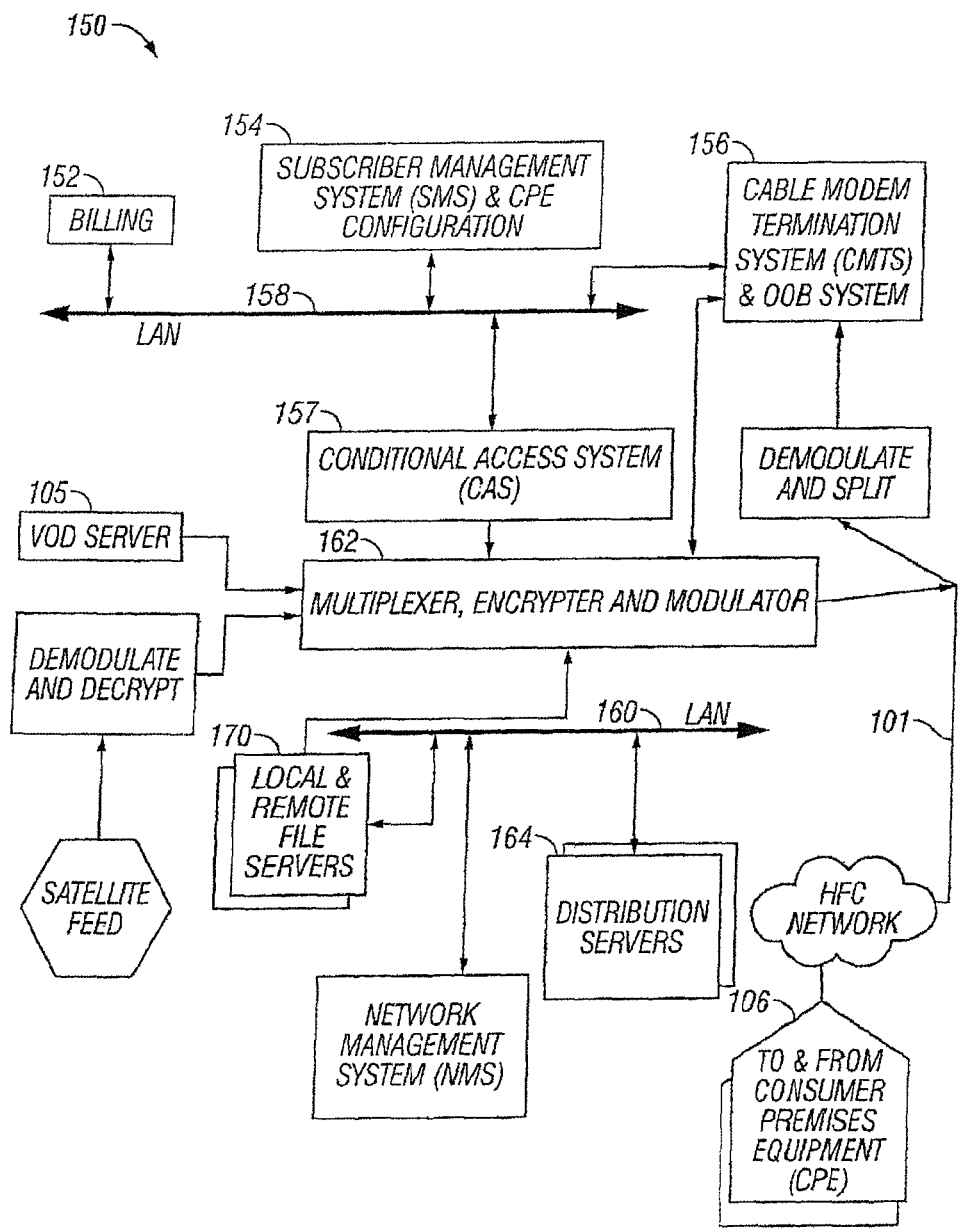
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
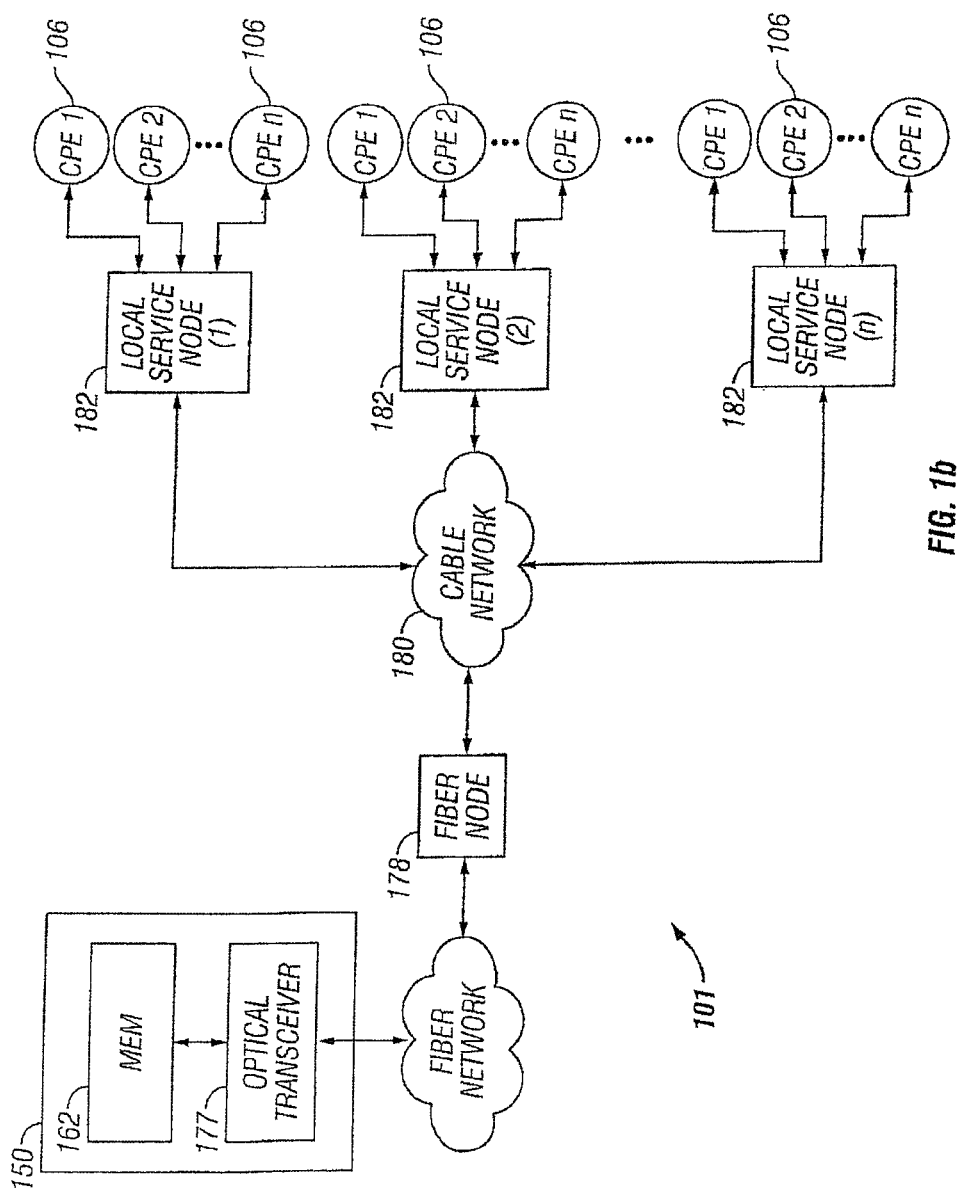
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
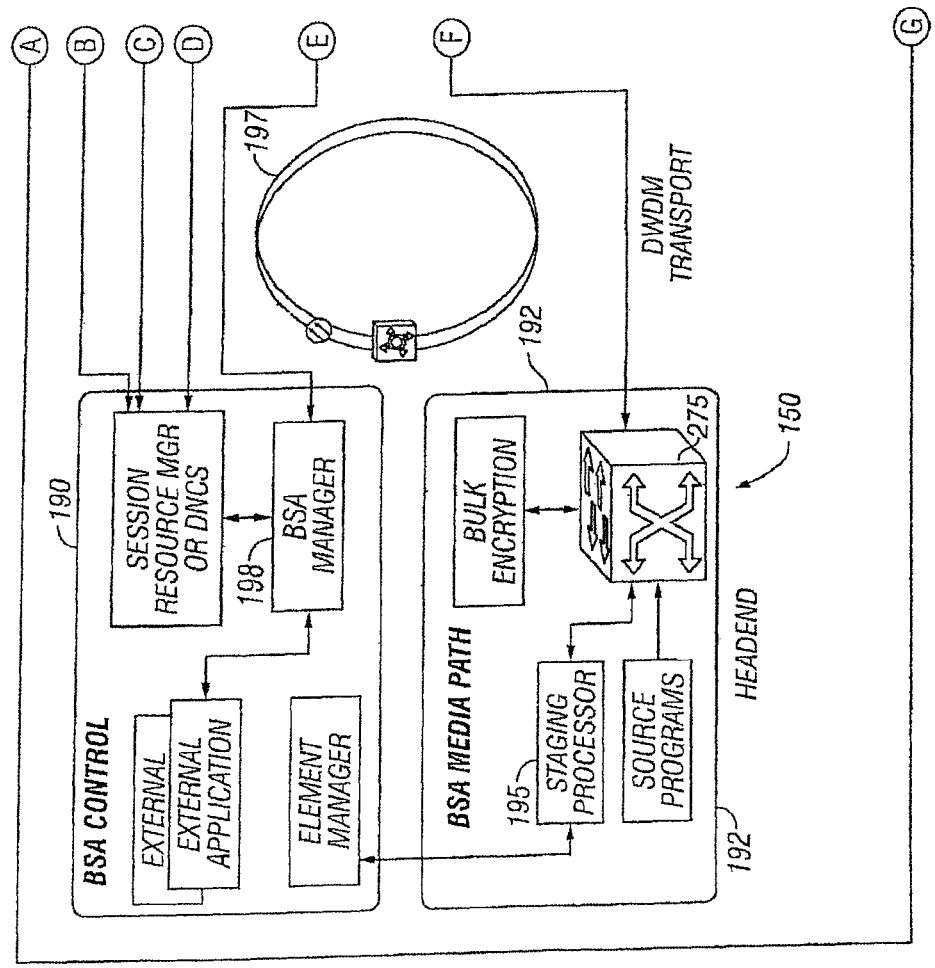
FIG. 1c is a functional block diagram illustrating one exemplary broadcast switched architecture (BSA) network useful with the present invention.
Figure 1C:
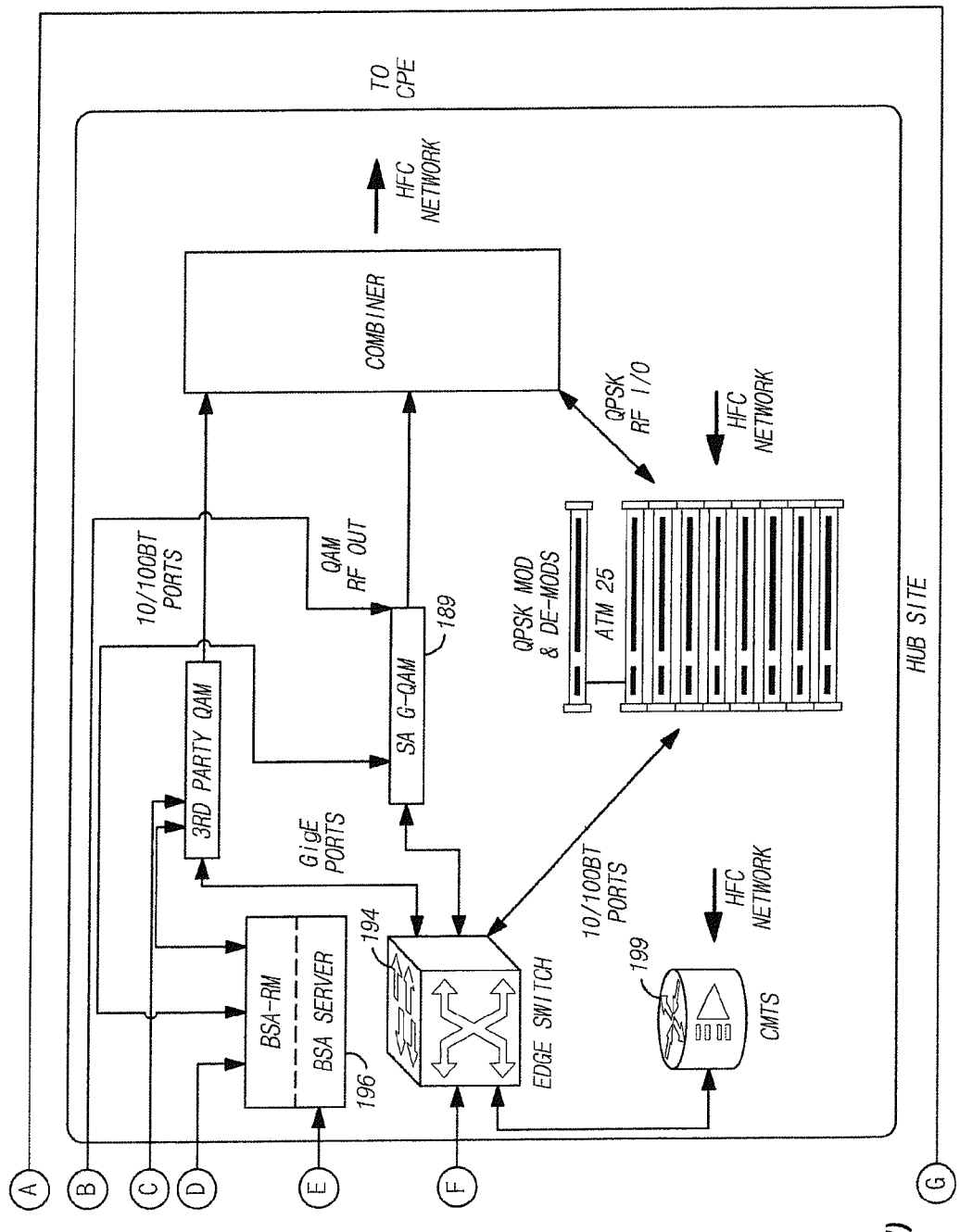

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates an exemplary configuration of a "switched" network architecture (referenced above), which is also useful with the premises gateway apparatus and features of the present invention.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "Technique for Effectively Providing Program Material in a Cable Television System", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and FIG. 1d, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
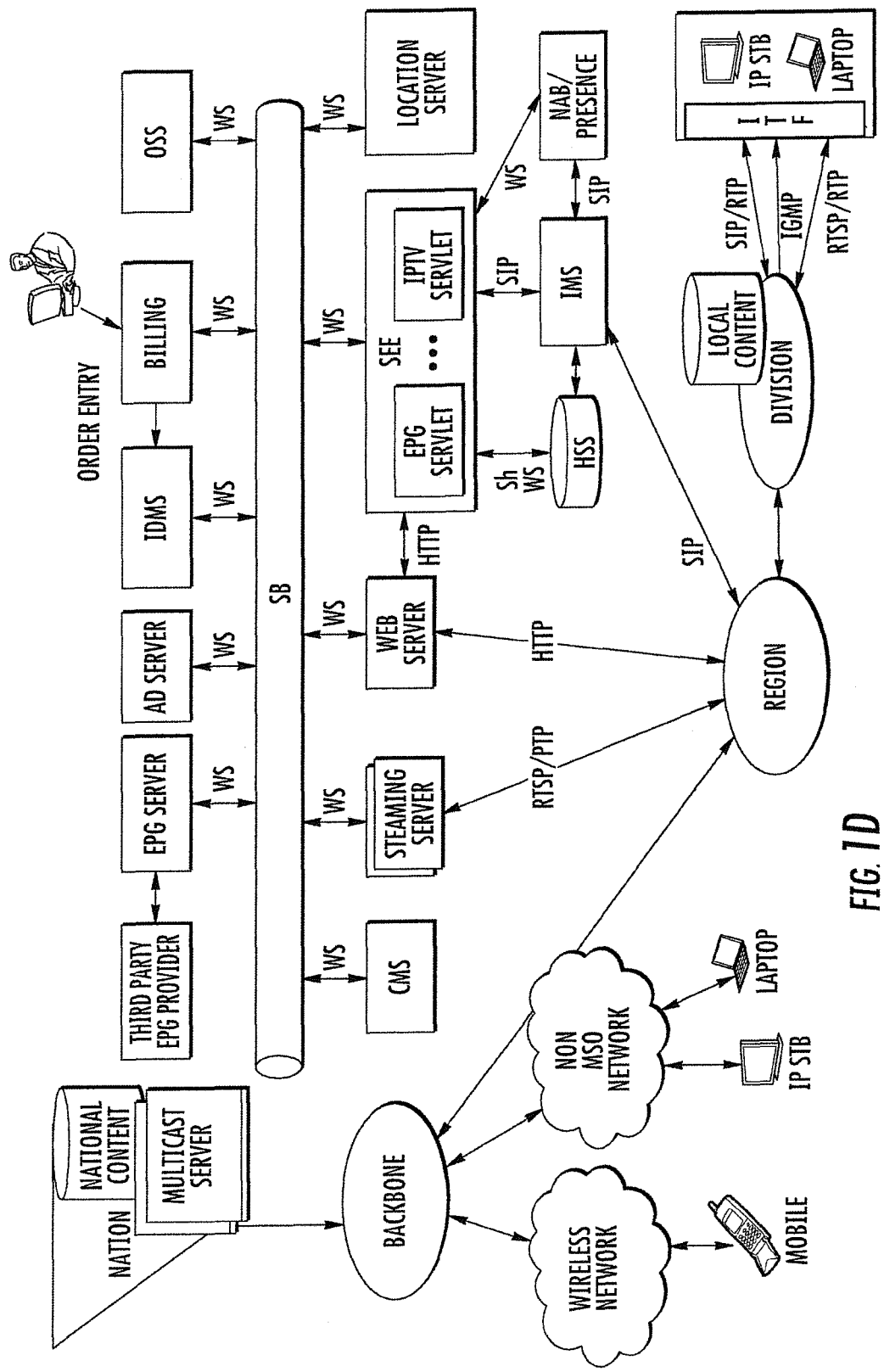
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. patent application Ser. No. 12/764,746 entitled "METHODS AND APPARATUS FOR PACKETIZED CONTENT DELIVERY OVER A CONTENT DELIVERY NETWORK, filed Apr. 21, 2012, incorporated herein in its entirety. Such a network provides significant enhancements in terms of, inter cilia, common control of different services, implementation and management of content delivery sessions according to unicast or multicast models, etc.; however, it is appreciated that the various features of the present invention are in no way limited to any of the foregoing architectures.

Automated Highlight Reel Creation Architectures—

Figure 2:
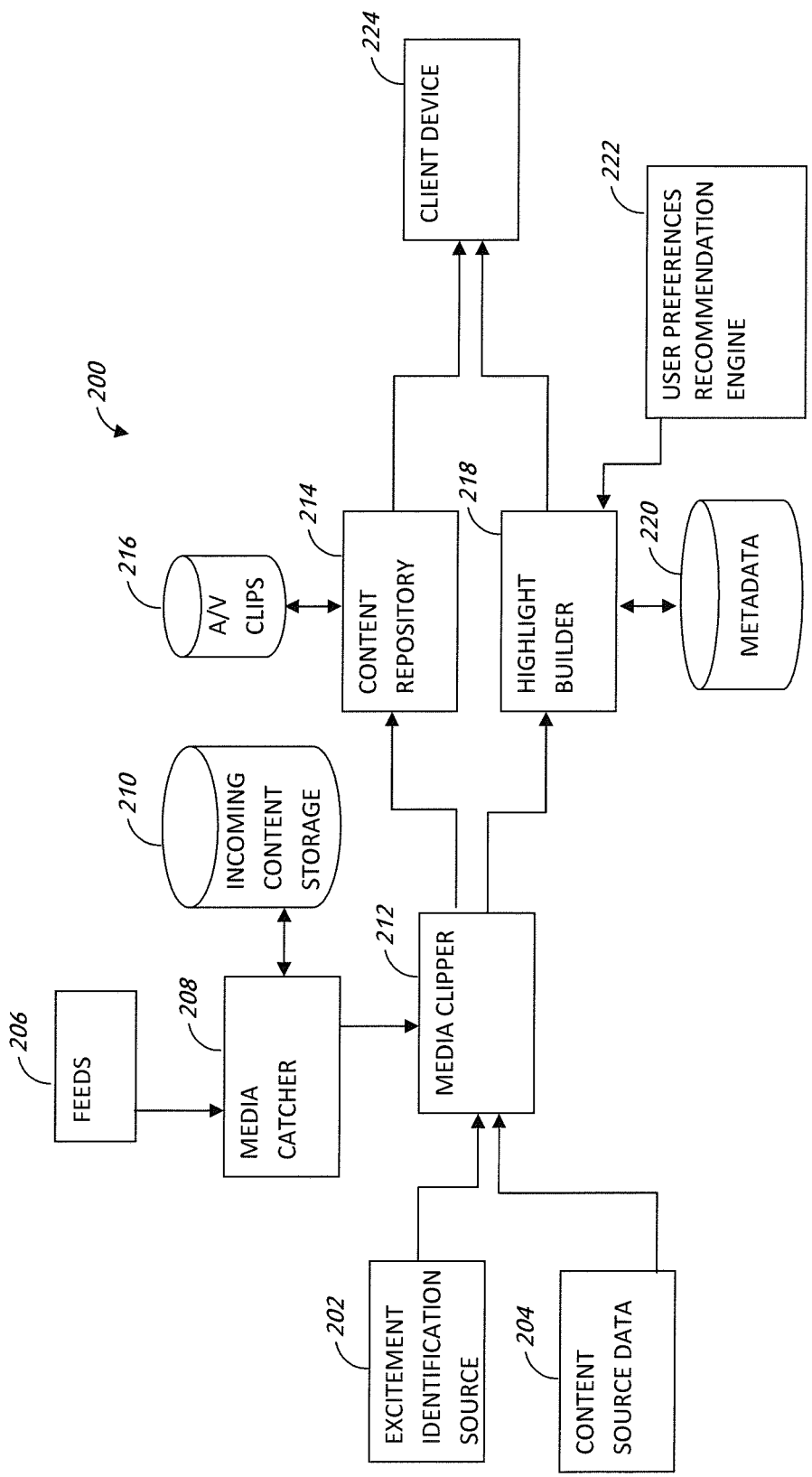
FIG. 2 is a functional block diagram illustrating one exemplary embodiment of an apparatus configured for the automated generation of targeted or focused content extractions and/or compilations (e.g., highlight reels) according to the present invention.

Referring now to FIG. 2, one exemplary embodiment of an apparatus 200 for the automated generation of highlight reels is shown. The apparatus is useful with the above network types; however, as will be appreciated from the following description, may be used with literally any network topology.

In the exemplary embodiment, metadata generated by an identification entity 202 (hereinafter colloquially referred to as the "Excitement Identification Source" (EIS)) is used by the apparatus 200. The metadata may be accompanied by supplemental data supplied by the content source 204. Feeds 206 are fed through a media catcher 208 which is in data communication with an incoming content storage unit (ICS) 210. The media catcher and storage unit is configured to hold an archive of any and all feeds 206 coming through the media catcher 208. The ICS 210 stores feed content from as little as the last few minutes or seconds, up to even multiple years, for feed archiving. TA media clipper 212, being in data communication with the EIS 202, the content source 204, and the media catcher 208, parses the feeds 206 and the archived feeds present in the ICS 210 into clips, the parsing based on the metadata from the EIS 202 (and the supplemental data from the content source 204 when present). It can be appreciated that a given piece of EIS metadata may have a number of associated feeds and clips (i.e., multiple related commentaries, camera shots/angles, media types, or network presentations, etc.). The clips (or some portion of the clips) are then forwarded to a content repository (CR) 214, where they are maintained in A/V storage 216 until needed for viewing.

The media clipper sends the metadata associated with the clips to a Highlight Builder (HB) 218 for holding in metadata storage 220. The HB then uses user preferences and data from a recommendation engine 222 to build a series of highlights for a user or group of users. The HB compares the user preferences and recommendations to the metadata associated with the clips. Thus, the HB selects appropriate clips based on their associated metadata from the EIS 202. The clips are then ordered accordingly and presented in a video stream to a client device 224 for display.

The apparatus of FIG. 2 is adapted to operate with a number of different types of EIS 202. EISs are sources of metadata that identify points of interest in presentation media. EISs may include for example Twitter accounts or "hash tags", social media items (likes, posts, and/or messages), RSS feeds, instant messages, emails, network activity alerts, web applications, and/or blogs, etc. In one embodiment, a spike in twitter hash tags related to a specific subject or person alerts the EIS to generate clips for the preceding or upcoming minutes or hours on feeds with related subject matter. For example, a spike in hash tags related to the President of the United States may indicate that the President has made or is about to make a comment or announcement.

In other embodiments, a dedicated RSS feed is used as the EIS. The RSS feed generates specific messages to alert the system of content of interest. For example, an RSS feed dedicated to sports, such as THUUZ® or FanVibe®, or a web application such as, "Are You Watching This?!" running on the RUWTbot engine, provide updates that alert the system that a particular game is exciting, or is likely to be exciting at least momentarily. Thus, upon recite of such an update, the exemplary video clipper begins generating clips from the feed showing the appropriate game, so as to capture the points of interest. It will be appreciated that the combination of the media catcher 208, the ICS 210, and the media clipper 212 allow the system to generate clips both from live feeds and archived feeds. Thus, consistent with the present invention, both real-time (or near-real-time) and non-real-time EISs can be used, including in conjunction with one another.

The metadata from the EIS 202 is then used to properly classify the clips. The classification of the clips assists the HB 218 in selecting appropriate clips based on user preferences and/or user targeted recommendations. These user (or group of users) targeted recommendations can be generated using for example the exemplary methods and apparatus discussed in co-owned and co-pending U.S. patent application Ser. No. 12/414,554 filed Mar. 30, 2009 and entitled "PERSONAL MEDIA CHANNEL APPARATUS AND METHODS" previously incorporated herein. As discussed therein, methods and apparatus for "fused" targeted content delivery are presented. Specifically, a substantially user-friendly mechanism for viewing content compiled from various sources selected to align with a user's preferences is disclosed; the content is displayed as a substantially continuous stream as part of a "virtual" user-based channel or a virtual private media channel (VPMC). In one embodiment, a user profile is constructed and targeted content gathered without requiring any user intervention whatsoever; e.g., based on a user's past or contemporaneous interactions with respect to particular types of content. The "virtual channel" acts as a centralized interface for the user and their content selections and preferences, as if the content relevant to a given user were in fact streamed over one program channel.

In another aspect of the present invention, the compiled content is presented to the user in the form of a "playlist" from which a user may select desired content for viewing and/or recording. In one variant, a user is also presented with content having varying degrees or aspects of similarity to that presented in the "playlist" or elsewhere, including content listed in the EPG.

In yet another variant, the user's purchase of recommended (and non-recommended) content is enabled directly from the aforementioned playlist and/or the virtual channel.

Client applications (e.g., those disposed on a subscriber's CPE, mobile devices, and/or network servers) are utilized to compile the playlist based on user-imputed as well as pre-programmed user profiles. Various feedback mechanisms may also be utilized to enable the client application to "learn" from the user's activities in order to update the user profile, and generate more finely-tuned and cogent recommendations. Client applications may also be utilized to manage the seamless presentation of content on the aforementioned virtual channel, and locate/flag various scenes inside selected content for user viewing or editing.

The foregoing disclosures further disclose methods for combining multiple profiles to create a composite set of preferences for different "moods" single user (or for a group of users desiring content of interest to all parties), which may be utilized consistent with the present invention. These techniques may be applied to both primary content and advertising (or other forms of secondary content), or each individually.

In addition, complimentary user-based recommendation techniques are also discussed in co-owned U.S. patent application Ser. No. 12/414,576 filed Mar. 30, 2009, entitled "RECOMMENDATION ENGINE APPARATUS AND METHODS", and issued as U.S. Pat. No. 9,215,423 on Dec. 15, 2013, previously incorporated herein. As discussed therein, methods and apparatus are presented for the identification and recommendation of content targeted to a particular user (or group of users) within a network. A mechanism for particularly selecting content to align with a user's preferences (the latter which the viewer need not enter manually) is discussed. The content is selected through a mechanism to learn (and unlearn) the user's preferences and which content they are likely to enjoy based on actions taken with regard to the content, so as to more finely tune the recommendations.

Referring again to FIG. 2, the content repository (CR) 214 stores a plurality of clips associated with the metadata used by the highlight builder (HB). The content repository stores the clips for future content streams ordered by the HB 218. As discussed above, the content streams in the exemplary implementation are organized by the HB based on the EIS 202 metadata, the content source metadata, user preferences, and input from recommendation engines. The content streams are then compiled by the content repository, and streamed to the client device based the order set forth by the HB. In some embodiments, the clips may be presented in a menu for browsing. Thus, the user may view all available clips, and/or filter the clips based on various options (e.g., excitement level, recommended clips, subject matter, date/latency, etc.). For example, a user may wish to select from all clips with excitement level above a given threshold and pertaining to sports. Alternatively, a user may simply wish to browse all clips that have been recommended by a recommendation system, or the foregoing (filtered).

It can be appreciated that the system, as discussed, is practiced in multiple architectures. In some embodiments, the system is substantially located on the headend of content distribution network. In these cases, the live feeds and the content source data are externally provided, and the client device may include an intermediary CPE 106 or be disposed on a CPE. Further, the EIS may either be an external entity or monitoring-type application(s) disposed on the headend server. In other embodiments, the system may be substantially disposed on a CPE (or premises network of CPE). In these cases the live feeds, the content source data, the EIS are all external to the CPE. The system may also be distributed across a number of components on a content delivery network.

Headend Server Architecture—

Figure 3:
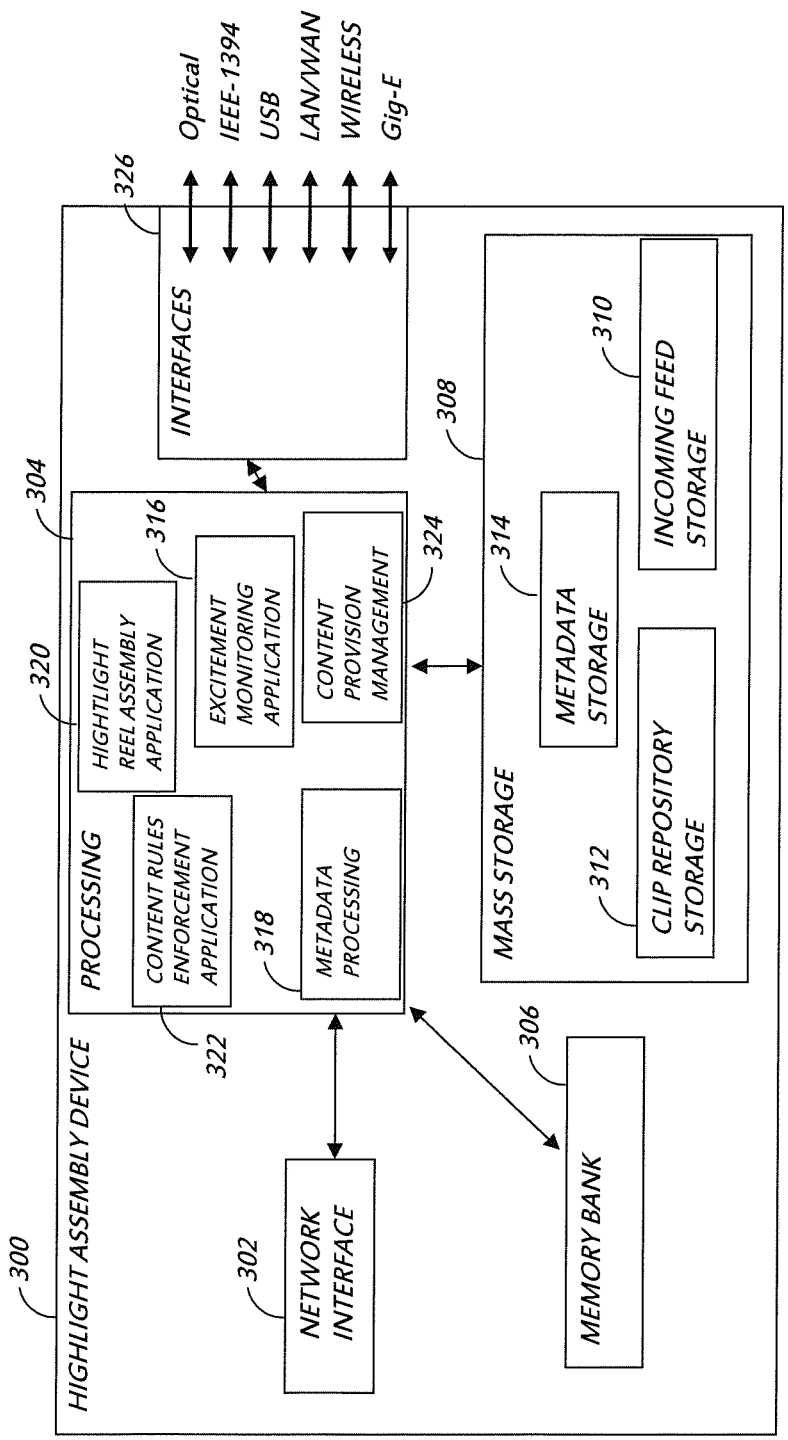
FIG. 3 is a functional block diagram illustrating one exemplary headend configuration useful with the present invention.

Referring now to FIG. 3, one embodiment of the content extractions and/or compilation ("highlight") assembly device 300 is shown and described. It will be appreciated that while this apparatus 300 is described primarily in the context of a highlight reel embodiment, the invention is in no way so limited, and such highlights are but one exemplary use and application for the technology.

The highlight assembly device 300 is a module adapted to be disposed on a headend server or other network-side entity, and provide content streams to CPE 106 and client devices 224 at the user's location. The feeds and content source metadata are delivered to the apparatus via the network interface 302. In some embodiments, the EIS metadata also arrives via the network interface. The network interface is in data communication with the processing unit 304. The processing unit 304 is in data communication with a memory or storage device 306 to provide the programs running on the processing unit fast memory access. The processing unit stores the incoming feeds on incoming feed storage 310 on the mass storage unit 308 for subsequent processing. In one embodiment, if not received from one or more external sources, the EIS metadata is generated by the excitement monitoring application (EMA) 316. The EIS metadata (whether internally or externally created) and the content source metadata are provided to the metadata processing application 318.

In operation, the metadata processing application splits the live feeds into clips, and associates metadata with the clips. The clips are sent to the clip repository storage 312 and the associated metadata is stored in the metadata storage 314. Alternatively, in some embodiments, the clips and metadata are stored together in the same storage mode, and in some cases, in the same file.

The highlight reel assembly application (HRAA) 320 reviews the metadata, and compares the metadata to user preferences and recommendation engine input in order to create series of clips (or single clips) to be played back to the user, either automatically or upon user request. The HRAA 320 generates a playlist containing the series. Then, the content provision management application generates a content stream for provision to the client device 224 (or, in some embodiments, an intermediary CPE 106). The provision of the content stream can occur either through the network interface, or through any of the multitude of other interfaces 326 disposed on the highlight assembly device 300.

Further, the content rules enforcement application 322 may monitor the content series assembly performed by the highlight reel assembly application 320 to enforce restrictions on the latter; e.g., that the assembly application does not use content for which the target user/subscriber/CPE lack the rights (or subscriber level) to consume. However, it is envisioned that, in some cases, the MSO may provide the target user with a "teaser" (e.g. content from a higher subscriber level), or yet to be released content, to entice to user to increase their associated subscriber level (or for other promotional reasons). Once assembled, the content may be provided to a used via the content provision management application 324.

The network interface 302 comprises any number of high-speed data connections to facilitate the inclusion of the highlight reel assembly device at the headend of the network. The connections must supply bandwidth sufficient to support the incoming feeds, and include any of the interfaces necessary to support any of the network architectures discussed above. Such connections or interfaces may include for instance Gigabit Ethernet/10G, IEEE-1394, Thunderbolt™, or other well known networking technologies.

In an exemplary embodiment, the processing unit 304 and memory 306 are specifically configured to support the applications running on the processing unit. Thus, the processing unit is connected via high bandwidth channels to each of the memory, mass storage, network interface, and any other incoming/outgoing interfaces.

As noted above, in some embodiments the EMA 316 monitors various information sources (including Twitter posts, blogs, sports site comments, content source webpage posts, and live commentary, etc.) to gauge user interest in particular events. Further, the MSO may provide its customers with remotes or other interface options (e.g. on-screen display options, telescoping advertisements, weblinks, phone/smartphone apps, etc.) to allow users to identify for a MSO when a particular event is exciting. Machine intelligence techniques can be applied to the various sources. In an exemplary embodiment, the system, upon reviewing a Twitter post, attempts to gauge if the poster of the "tweet" is currently finding the event particularly exciting. Then, the system attempts to corroborate these findings with other such posts (including posts or information from other sources). Once a finding is made, a time-stamped metadata file is created and passed to the metadata processing application. The exemplary implementation of the EMA 316 must properly calibrate its analysis for a number of variables, as will be discussed below.

In some embodiments, all incoming feeds are recorded and placed in mass storage 308. In other embodiments only certain events and/or channels are recorded. This selection or filtration may be based on past use of the recorded feeds, user preferences, and/or ratings, etc. The feeds are time stamped during the recording process for later reference to the EIS and content source metadata.

Once passed to the metadata processing application 318 (either from the EMA 316 or an external EIS), the metadata file is processed for storage. This process includes using the time stamp to identify the portion of the captured incoming feed that pertains to the metadata. Thus, the associated source and time of the event must be identified. This is achieved through comparisons with content source metadata. Alternatively, this may also be achieved through a pre-compiled list of content on each of the various incoming feeds. Once the related portion of an incoming feed is identified, other metadata assisting in the classification of the clip is appended to the metadata file. This may include subject matter, source, genre, title of the event, date/time information, a brief description of the content, and/or the overall likelihood that the clip is "newsworthy" (such as by virtue of being associated with a known exciting sports player, popular personality, etc.). The clips and metadata are then placed in mass storage 308.

The content rules enforcement application 322 maintains sets of rules associated with content and content sources. For example, some content sources may require that none of their content be replayed without explicit permission from that source. In the case when such permission is not granted, the content rules enforcement application bars the HRAA 320 and the content provision management application from including and replay clips from that source. Conversely, if the permission is granted, the content rules enforcement application lifts the bar on inclusion and replay. Further, the content rules enforcement application 322 may contact the content source to obtain permissions related to a clip. Similarly, sources may have varying preferences for individual pieces of content. In some cases, the content source may limit the time after the initial broadcast for which clips may be replayed, or limit their playback to only certain prescribed periods of the day or week. In these cases, the content rules enforcement application enforces an expiration date or other appropriate use restrictions for clips associated that content source.

Once the clips and metadata are available in mass storage, the HRAA 320 begins building series of clips (or single clips) for provision to specific users or groups of users. The HRAA takes pre-set preferences or those from recommendation engines (based on techniques discussed supra) to generate the highlight collections. In an exemplary embodiment, a user requests clips pertaining to a specific sports team. Then, the HRAA readies clips related to that sports team. Further, the user may request clips for that sports team over a given period of time (e.g. the user requests an update on the past week of Chicago Cubs games). In this case, the HRAA automatically locates clips for that team and time period, and compiles reels for play upon an explicit user request, a teaser suggesting interesting content, or as part of a VPMC.

It can also be appreciated the clips need not be assembled only for a specific user or set of users. In some embodiments, a dedicated clip channel is created. Thus, any user tuning the logical or physical channel associated with the clip channel may view it. These clip channels may be subject specific. For these dedicated clip channels, the HRAA uses a general set of preferences rather than one specific for a set of users. In some embodiments, the HRAA also accepts input from the content rules enforcement application. This input ensures that only clips available to the target user or users are included in the series.

After the clip series is compiled by the HRAA 320, the content provision application 324 provides the clips to the user when requested. The content provision application provides the clips through a media stream to a client device operated by the user. In some embodiments, content provision application merely directs a separate VOD server to provide the clips in the order set forth by the HRAA. In other embodiments, the content provision application itself creates the media stream via the onboard interfaces in the highlight assembly device 300. The content provision application also enables and/or enforces rules related to "trick mode" operation (e.g. fast forward, rewind, play, pause, change camera angle, etc.). In some embodiments, the content rules enforcement application provides these rules (as they pertain the user(s) in question) to the content provision application. The content provision application may further make use of A/V codecs in the creation of the media stream.

It is envisioned that in some embodiments, the compilation of a clip or series of clips may involve some level of processing to generate a playable media segment (e.g. more processing than simply playing the clips in the designated order), such as transcoding, transrating, and so forth. Co-owned U.S. patent application Ser. No. 10/970,429 filed Oct. 21, 2004 and entitled "PROGRAMMING CONTENT CAPTURING AND PROCESSING SYSTEM AND METHOD" incorporated by reference herein in its entirety, details methods and apparatus for compiling playable segments from blocks of media on the fly. As discussed therein, program streams are broken into segments, and further into blocks to allow of customizable playback. In an exemplary embodiment, a specific segment is requested the associated blocks are identified and then joined. The media is then presented to the user. In the case that all blocks associated with a given segment are not yet available (e.g. not yet processed or broadcast), the available blocks may be joined to the unavailable blocks and playback may commence prior to the availability of all blocks. For example, consistent with the present invention, a user may be enticed to view a series of exciting clips from a sporting event by a short initial clip. However, the full series of clips may include footage not yet broadcast. Thus, using the techniques described in the above-identified application, the user may view the series of clips in a single coherent session despite the fact not all clips were available (or even in existence) at the time the user began to view the series.

Exemplary CPE—

Figure 4:
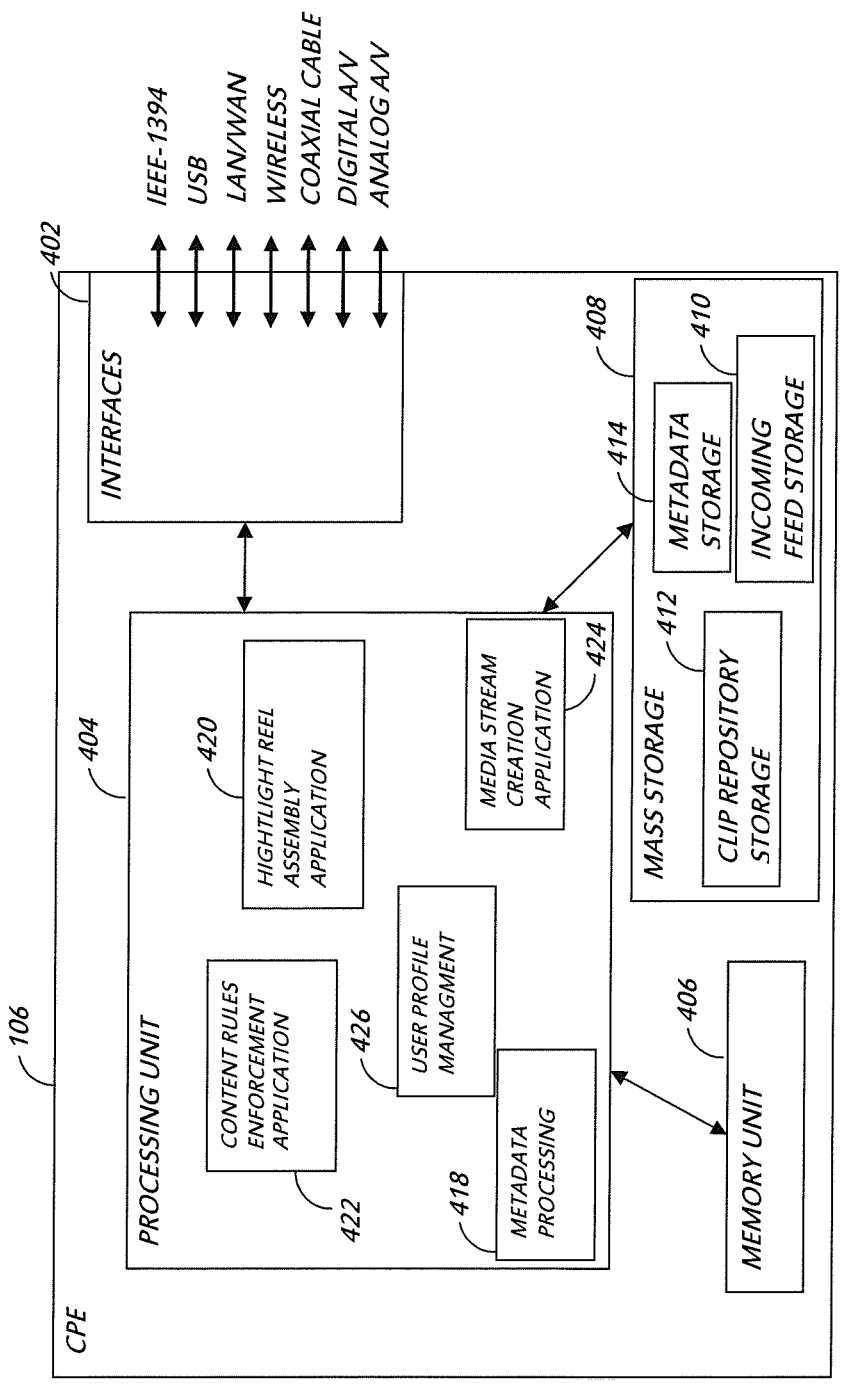
FIG. 4 is a functional block diagram illustrating one exemplary consumer premises equipment (CPE) configuration useful with the present invention.

Referring now to FIG. 4, exemplary consumer premises equipment (CPE) 106 consistent with the present invention is shown. In one embodiment, live feeds are sent to the CPE via one or more of its interfaces 402. The metadata from the EIS 202 and content source 204 also arrives over these interfaces. In some variants, the delivery modality is the same for both the feeds and metadata, although it may be different. The metadata and incoming feeds are passed into the mass storage unit 408. The mass storage unit has modules for storing incoming feeds, clips, and metadata (items 410, 412, and 414, respectively). The metadata processing application 418, running on the processing unit 404, analyzes the EIS 202 and content source 204 metadata, and parses the stored live feeds into clips associated with the individual metadata updates.

Once the clips have been parsed, the highlight reel assembly application (HRAA) 420 begins compiling series of clips and/or individual clips for display to a user (or group of users) associated with the CPE. The HRAA 420 uses preferences obtained from the user profile management application 426 to select the clips for inclusion. Furthermore, in some embodiments, the HRAA ensures that the clips included in the compiled series comply with the content rules based on input from the content rules enforcement application.

The content rules enforcement application 422 on the CPE has similar function to that discussed above with respect to the headend embodiments. The series compiled by the HRAA 420 is used by the media stream creation application to create a playlist of clips for the user or users of the CPE. Playback of the clips occurs upon request, automatically, or in response to a request to tune to a VPMC.

It is envisioned that when used in conjunction with the above-discussed headend apparatus, one or more of the functionalities of the CPE may obviated. Thus, in some embodiments, functionality may be removed from the CPE and instead provided by the headend. Conversely, functionality not supplied by the headend may be present on the CPE. It will also be appreciated that users may desire repeat functionality on their own associated CPE for premium performance and customizability that may not be offered by the headend-based device.

The interfaces 402 comprise one or more incoming and/or outgoing ports (e.g. serial, network, radio frequency, and/or display, etc.). The live feeds are sent to the CPE via one or more of these ports. In some embodiments, interface resources such as tuners and/or bandwidth may be limited on any given CPE. Therefore, CPE on a premises network (or other network) may share such resources. Methods and apparatus from sharing these resources are discussed in co-owned and co-pending U.S. patent application Ser. No. 12/480,597 filed Jun. 8, 2009 and entitled "MEDIA BRIDGE APPARATUS AND METHODS" incorporated by reference herein in its entirety. As discussed therein, a media bridging apparatus acts as a connection between a portable media device (PMD) and a user's home network. This bridging apparatus may be used, for example, to convert content stored on the PMD to a format capable of being presented on a user's set-top box or other client device. Control of the presentation is also provided by the bridging apparatus. In one embodiment, the apparatus enables a user to access and control playback of media from a PMD via a user interface associated with a television, personal computer or other user device. The apparatus may also enable content stored on the PMD to be copied and stored on a user's digital video recorder (DVR) or other storage apparatus, optionally while maintaining appropriate copyright and digital rights management (DRM) requirements associated with the content being manipulated.

Furthermore, techniques and systems for intra-network resource sharing are also discussed in co-owned and co-pending U.S. patent application Ser. No. 12/480,591 filed Jun. 8, 2009 and entitled "METHODS AND APPARATUS FOR PREMISES CONTENT DISTRIBUTION" incorporated by reference herein in its entirety. As discussed therein, an apparatus manages content within a single device and for several devices connected to a home network to transfer protected content (including for example audiovisual or multimedia content, applications or data) in a substantially "peer-to-peer" fashion and without resort to a central security server or other such entity. The management, transfer, and "browsing" of content on a single device or on a plurality of devices is accomplished via a content handler. The content handler utilizes various algorithms in conjunction with several "buckets" to make management, transfer, and browsing possible. Further, a scheduling apparatus allows for the reservation of resources on multiple devices within a network. Thus, resources may be treated as if available to any of the network devices. The interfaces 402 which are bidirectional or exclusively outgoing are used by the CPE in the provision of media streams. In some embodiments, the CPE may be integrated in a display device and supply the media stream via digital or analog audio/visual (A/V) ports or via serial transfer. In other embodiments, the CPE is external to the display device, and the media stream may also be provided over a network interface or RF port.

The memory unit 406 provides high-speed memory access to support applications running on the processing unit.

As previously mentioned, the mass storage unit 408 is configured to store the live feeds, metadata, and clips. Further, the storage unit must also be configured to support the provision of a media stream from the stored clips. Thus, in some embodiments the mass storage unit is multi-modal. In some cases, this comprises archival space in lower-speed low-cost storage (such as optical or magnetic storage systems, etc.) and higher-speed (e.g. in terms of seeking and/or transfer operations, etc.) higher-cost and or higher-power consumption storage (e.g. flash memory, high-RPM hard drives, and/or high-speed volatile memory, etc.). In these embodiments, the higher-speed memory would be used as a cache for active operations (e.g. clip parsing or media streaming, etc.).

The processing unit 404 runs a number of applications to manage the parsing of live feeds into clips, user profiles, the selection of clips, the compilation of series of clips, and the provision of media streams. To facilitate these operations the processing unit is in data communication with the memory unit, mass storage units, and incoming/outgoing interfaces using any number of well known bus or other data interface architectures.

The metadata processing application 418 reviews the metadata from the EIS and content source. Based on this metadata, the metadata processing application parses the live feeds into media clips as discussed above with respect to the headend embodiments.

As discussed above, the HRAA 420 is responsible for applying user preferences and other profile data to compile series of clips (or single clips). In some embodiments, the HRAA accepts inputs from the content rules enforcement application 422.

The media stream creation 424 application uses the clips selected by the HRAA 420 to generate a media stream. The provision of these streams may occur via any of a number of methods. In some cases, the media is streamed over a local IP network to a second display device. Alternatively, a peer-to-peer method may be used over the IP network. In other embodiments, an analog or digital A/V protocol may be used to send the media to a directly connected or integrated display device, or alternatively a high-speed serial communication protocol is utilized. It can be appreciated that literally any method or protocol for provisioning media between two (or more) operatively connected devices may be used consistent with present invention.

The user profile management application 426 maintains user preferences for use with the HRAA. In one variant, the user profile management application collects user preferences as either solicited preferences from a user and/or volunteered preferences. The user profile management application runs a user interface to collect these preferences from the user. Further, in some embodiments, the user profile management application may also glean or passively obtain preferences from monitoring user action with respect to content (or other related user actions).

The user profile management application may also include a recommendation engine. This recommendation engine may serve other external network connected devices. In other embodiments, the user profile management application collects data for a recommendation engine running on an external server. Thus, a single profile may be used on multiple devices in either case. Whether the recommendation engine run locally or on an external network entity, the engine still provides input to the HRAA.

Distributed Embodiments—

Figure 5:
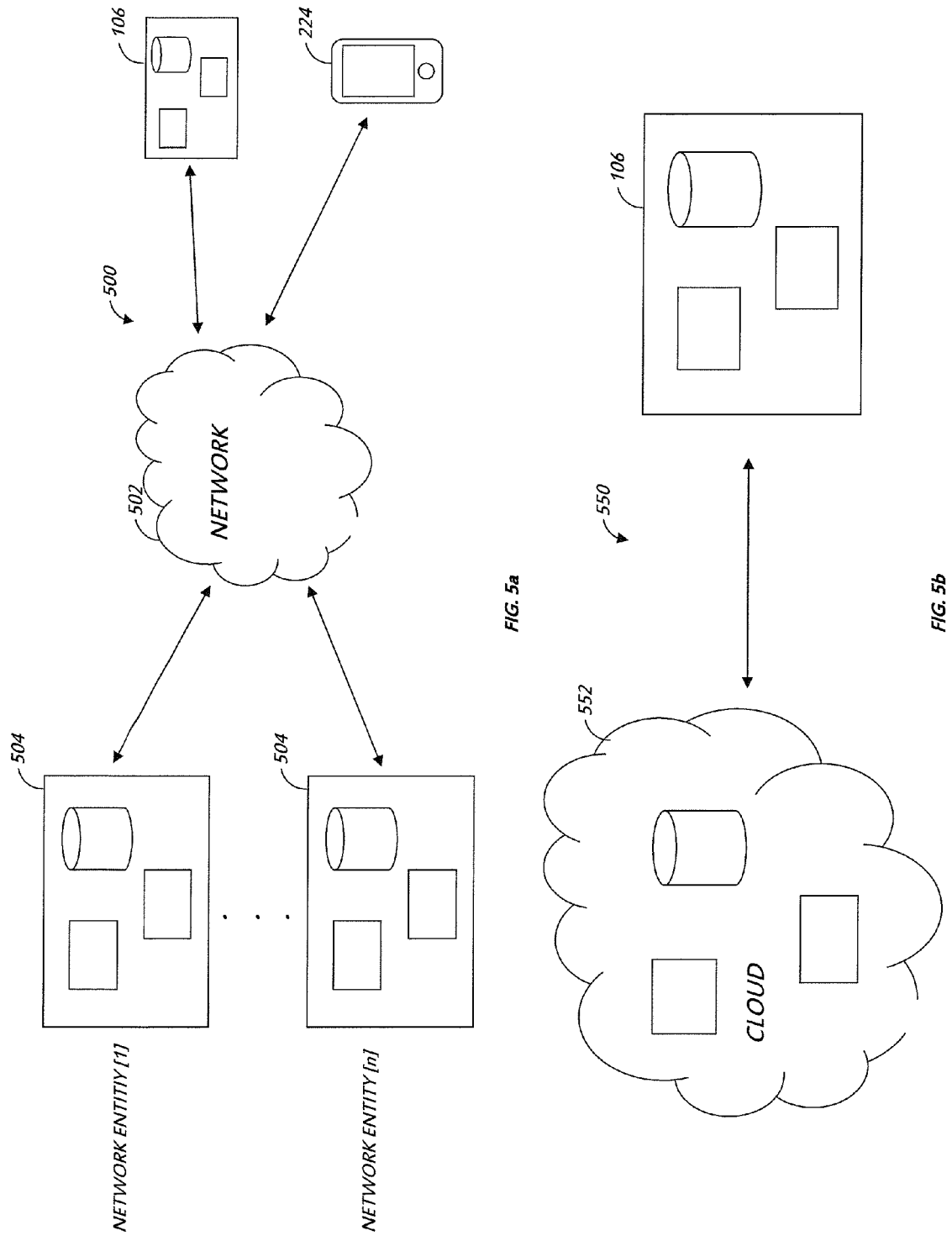
FIG. 5a is a functional block diagram illustrating one exemplary distributed computing environment useful with the present invention.
FIG. 5b is a functional block diagram illustrating an alternative exemplary distributed computing environment useful with the present invention.

Referring now to FIG. 5*a*, an exemplary distributed embodiment of the aforementioned content extractions and/or compilation apparatus is shown. In this case, multiple network entities 504 each comprising storage, memory, and/or processing capabilities (e.g. media servers) each run specific tasks and are in data communication with a network 502. Any of the tasks discussed above with respect to the headend and CPE embodiments above may be distributed on to any number of network entities. In an exemplary distributed implementation, a specific server is responsible for recording and maintaining incoming feeds. In this case, another server processes the metadata, and identifies the corresponding portions of the incoming feeds. The metadata server then sends the metadata to the feed server. The feeds server then parses the clips and forwards the clips to a CPE 106. The CPE runs a HRAA to compile the clips into series and creates video streams for the user.

In other configurations, the individual applications discussed above are run in a distributed fashion. In one embodiment, the portion of the HRAA that selects clips is run on a server, and the portion of the HRAA that orders the clips into a series for playback is run on the user's CPE.

Further, in some embodiments, the network entities may simply provision the clips in a video stream via the network directly to a client device 224. It will be appreciated by those skilled in the art given the present disclosure that myriad other divisions of application can be made in various distributed embodiments according to the invention.

Referring now to FIG. 5*b*, an exemplary "cloud" based embodiment 500 is shown. The cloud embodiments are generally distributed architectures in which any one of many network entities performs a given task. Those skilled in the art will appreciate that several servers or other entities in a managed network may be configured for the same tasks, and the cloud 502 comprises any number of these configured entities. Thus, the cloud embodiment allows for any one of these pre-configured and pre-designated network entities to run any of the tasks discussed above with respect to the headend and CPE embodiments. In this regard, the MSO is offered flexibility in balancing loads and traffic on different network entities. Even as the MSO balances these network nodes, the cloud processes may be opaque to the user. Thus, the user notices no significant change in operation, but may notice changes in performance (to the extent the network load balance is optimized).

Further, referring back to FIG. 5a, the user may also distribute usage among multiple devices (e.g. CPE, computers, TVs, mobile devices) even if those devices are not always (or ever) on the same premises network. For example, the user may use both a CPE on his home network and a smartphone or tablet computer on a cellular network, or a laptop on a Wi-Fi WLAN. Techniques and architectures for provisioning such mobile devices will be discussed in the next section.

Mobile Devices—

In some embodiments, a user may receive, view, or request the clips on a wireless mobile device. In these embodiments, the user connects to a media server using a browser, guide application, or other application, and the clips are provisioned to user via the network to which the wireless device is connected. The wireless network associated with the device may be any of those mentioned above, and may further include WLAN (e.g., Wi-Fi) or cellular technologies such as 3G and 4G technologies (e.g. GSM, UMTS, CDMA, CDMA2000, WCDMA, EV-DO, 3GPP standards, LTE, LTE-A, EDGE, GPRS, HSPA, HSPA+, HSPUA, and/or HSPUA, etc.). Also the wireless link of the mobile device may be based on a combination of such networks used in parallel, such as for example where the mobile device is a hybrid phone capable of utilizing multiple air interfaces (even simultaneously). Further, in some embodiments, the mobile device may foreword clips or other content provisioned through the network to other client devices via the same or a second network (e.g., receive via LTE, and forward via WLAN or PAN such as IEEE 802.15).

In some embodiments, the mobile device comprises a display unit such as a touch-screen display and input device. The display unit is used for, inter alia, displaying requested clips and presenting information and options to the user. Further, audio and even tactile (e.g., vibrational) hardware may be included for presentation of content through other physical sensations.

The mobile device includes a user interface for managing direct user requests, user management of applications, and other functions. In some embodiments, the user interface comprises one or more soft-function keys on the aforementioned display device to allow for contextual input from a user. However, in light of this disclosure, it can be appreciated that a multitude of user interface implementations (including physical buttons, switches, touchpads, scroll wheels/balls, etc.) can be used in accordance with the present invention.

Exemplary methods and apparatus for providing media to IP-based mobile devices are presented in co-owned U.S. patent application Ser. No. 13/403,802 filed Feb. 23, 2012 and entitled "APPARATUS AND METHODS FOR PROVIDING CONTENT TO AN IP-ENABLED DEVICE IN A CONTENT DISTRIBUTION NETWORK", previously incorporated herein. As discussed therein, content is provided to a plurality of IP-enabled devices serviced by a content distribution network. In one embodiment, a network architecture is disclosed which enables delivery of content to such IP-enabled devices without the use of a high-speed data connection; i.e., via another distribution platform (such as for example a traditional CATV or other managed distribution network DOCSIS or in-band QAMs). This capability allows the managed network operator to provide audio/video content services to an IP-enabled device (e.g., mobile wireless content rendering device such as a smartphone or tablet computer) associated with a non-data subscriber of the operator's network. For example, an MSO is able to make content delivery services available to a subscriber's tablet computer (e.g., iPad™) when the owner thereof does not subscribe to the MSO's high-speed data network or services, and instead only subscribes to the MSO's video services. This approach advantageously enables a user to receive content on IP-enabled devices, which are generally more mobile than non-IP devices, thereby enhancing the user experience by allowing the user to received the content at various locations (as well as that specified in the subscription agreement; e.g., at the subscriber's premises), See also co-owned and co-pending U.S. patent application Ser. No. 13/403,814 filed Feb. 23, 2012 and entitled "APPARATUS AND METHODS FOR CONTENT DISTRIBUTION TO PACKET-ENABLED DEVICES VIA A NETWORK BRIDGE", previously incorporated herein, which may be used consistent with the present invention. As discussed therein, content is provided to a plurality of IP-enabled devices serviced by a content distribution network. In an exemplary implementation, extant network structure and function are utilized to the maximum extent in order to minimize MSO investment in providing such services, thereby also enhancing rapid incorporation of the technology and provision of services to the users/subscribers. Given that in some embodiments non-managed or third party networks are used to provide clip to devices consistent with the present invention, it will be appreciated that connectivity with a wide variety of devices (including wireless mobile devices) is achieved. Further, in some implementations, a recommendation engine runs on the mobile device, which receives metadata related to the clips from a media server (e.g. VOD server, headend, or CPE, etc.), and recommends clips or other content. If requested, the clips are then forwarded to the mobile device from a media server (either the same media server or another).

The use of mobile devices further facilitates the "social" aspects of the present invention. Some embodiments include applications for recommending videos to e.g., friends or family and providing incentives to users (e.g., coupons, discounts or exclusive media, etc.) for encouraging others to participate. The invention-enabled mobile device may also be equipped with near-field communication (NFC) or other wireless payment technology such as for example that set forth in ISO Std. 14443 for contactless payment, so as to facilitate use of such coupons, discounts, etc., such as via the well known Google Wallet approach.

Methods of Highlight Generation and Provision—

Methods useful with the exemplary systems and apparatus discussed above are now described.

In a salient aspect of the invention, incoming live feeds are recorded, and time-stamped metadata from sources (either internal or external) able to identify exciting moments and events is used to parse or select portions of the live feeds, so as to permit generation clips related to the exciting moments and events. Those clips are then sent to users for viewing. In some embodiments, a recommendation engine is used to select clips matching interests of a particular user or group of users. Single clips or series of clips may be sent to the matched users.

Figure 6:
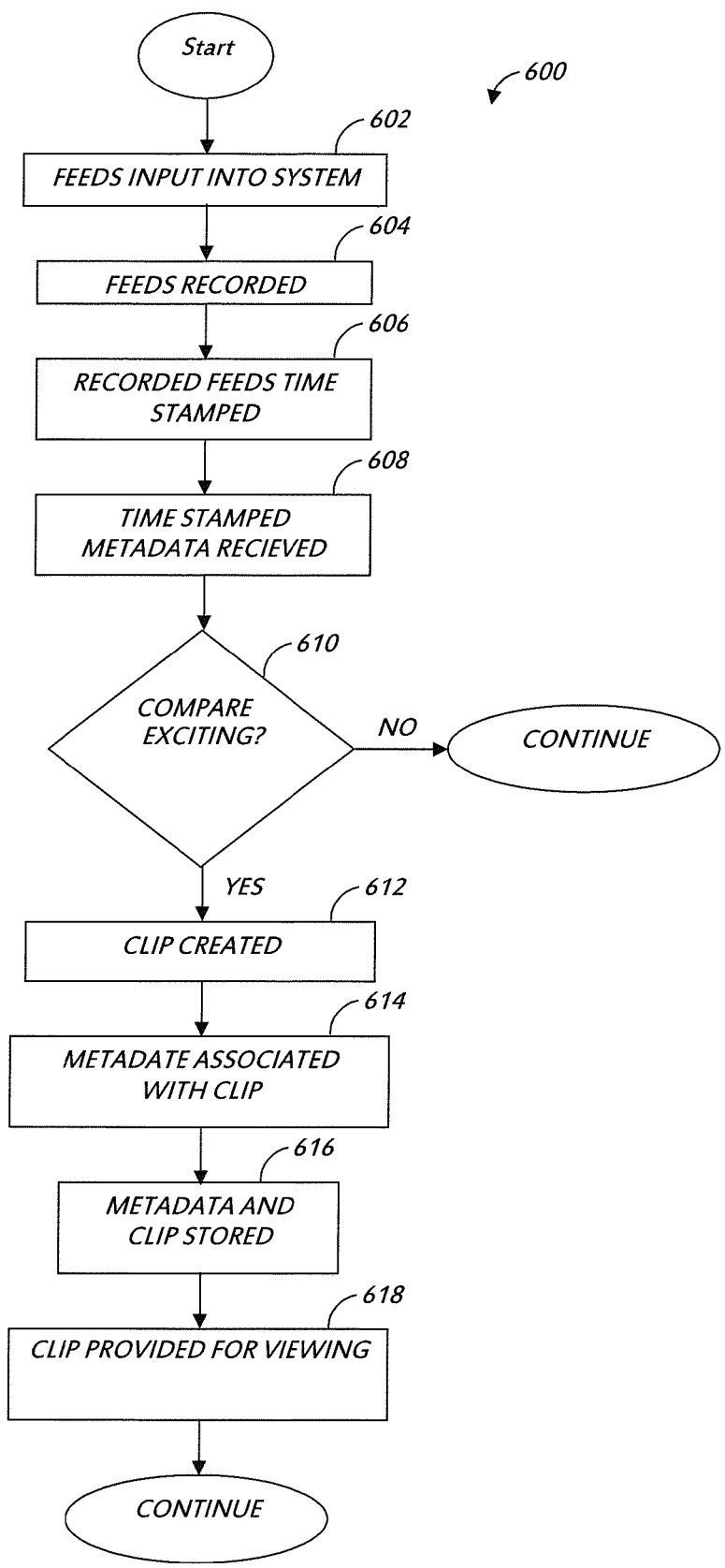
FIG. 6 is a logical flow diagram illustrating an exemplary method for the automated generation of a highlight reel according to the present invention.

Referring now to FIG. 6, a functional block diagram detailing an exemplary method 600 for the generation of a highlight clip consistent with the present invention is shown. At step 602 of the method 600, feeds from content sources are input into the system. The feeds are recorded and stored by a media recording system at step 604. The recorded feeds are then time-stamped (step 606). Time-stamped metadata from the excitement identification source (EIS) is received by the system at step 608. The time-stamps of the metadata are compared to the time-stamps of the recorded feeds (step 610). Based on the comparison step 610, a clip is taken from the feed at step 612 if the metadata indicates the clip corresponds to an exciting event. The EIS metadata is associated with the clip at step 614. The metadata and the clip are then stored per step 616 for later viewing. Upon subsequent request from a user or automated system, the clip is sent per step 618 to a device for use.

The clips may be presented to the user through recommendation by a recommendation engine, or by recommendation by another user or network entity. Alternatively, the user may request clips be played. The system may also be used to view series of clips whether related or otherwise.

It will be appreciated that the aforementioned metadata need not account for all periods of the live feeds, but rather only certain portions of interest. Further, during clip generation, the period covered by a clip may correspond to a shorter, longer, or identical duration to that specified in its associated metadata. In some embodiments, the metadata works as a lagging indicator of excitement. For example, an exciting event occurs and shortly thereafter it is identified. Metadata may also be used in an anticipatory or predictive fashion, such as where the excitement level associated with a sporting event is predicted to increase under certain scenarios, such as an NFL team getting within the "red zone", the start or finish of the Indy 500, the kickoff of the Superbowl, etc.

In some embodiments, the metadata may only include the time at which that particular event was identified, rather than the time of the event itself. Thus, in such embodiments, the clip is selected so that it includes a period leading up to the time identified in the metadata. In other embodiments, the metadata provides time detail about the actual event, in addition to the time of identification. Thus, the duration of a clip may correspond directly to the times provided in the metadata. However, it should be noted that a clip may still be extended or truncated in relation to the times provided by the metadata. An event may be identified in a time-stamped metadata file, but the MSO may wish to include surrounding material based on user preferences or content source rules. For example, an exciting play is a sports event may be identified, but the MSO provides a clip of the entire quarter comprising the event. Alternatively, an entire quarter is highlighted as exciting by the metadata, but the MSO only generates a single clip or series of clips from the exciting quarter. Thus, a "video snack" is presented to the user, as opposed to a long piece of content.

In embodiments involving previously broadcast material, including material only broadcast minutes or seconds prior, the technology to "lookback" at this material for review is important. Methods and apparatus for subsequent review and manipulation of previously broadcast content are discussed in commonly owned U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" previously incorporated herein by reference. As discussed therein, selected programs or program channels may be afforded a network personal video recorder (NPVR) service to enhance a user's enjoyment of programming content. In accordance with the NPVR service, broadcast programs (or at least those broadcast programs afforded the NPVR service) are recorded at a headend of a content delivery network when they are delivered to a user at a set-top terminal. Thus, the user not only may "reserve" for review a future program and a previously broadcast program, but also restart an in-progress program since it has been recorded at the headend regardless of any user request. That is, the NPVR service obviates the need of a proactive effort otherwise required of a typical DVR user, which includes deciding and actively electing in advance what shows to record. In addition, the NPVR service furnishes trick mode functions (e.g., rewind, pause and fast-forward functions) for manipulating a presentation of recorded programming content. Further, the lookback service may be implemented on any device within the content delivery network, including at a CPE capable of receiving and recording the live feeds. Thus, the feeds recorded without specific (or in some cases any) user intervention may be compared to the received excitement metadata for the generation of clips, consistent with the present invention.

This system may be used in review or catch-up. A user may wish to review all exciting clips related to a particular subject to provide then with a quick update or chance to review recent events. For example, a user may want to review an entire season of a sports team. Highlights from that season that were recorded in the lookback material would then be identified and compiled into a series of clips. Naturally, similar procedures are used with other events (single games, news coverage, political campaigns, reality-TV, late-night shows, user-created material, TV-serials, radio programs, etc.).

In one implementation of the invention, the system utilizes past recordings by the user at the CPE (or NPVR) to generate recommendations. Time-stamp and source data related to past recordings (or the actual recordings themselves) may be uploaded to the headend. The EIS metadata may then be cross-referenced with the recordings made by the user to identify patterns. For example, if a user has recorded the majority of plays made by Peyton Manning, the system identifies the user as a Peyton Manning fan. The system then provides other/future clips or reels related to Peyton Manning (or perhaps individuals or events having less direct relationship, such as Eli Manning, Archie Manning, the Indianapolis Colts, etc.).

The system may also offer "collection completion." For instance, in one such implementation, if a given user (or device) has recorded most of the content related to a given subject but has missed certain pieces, the system identifies the missing elements directly (and/or indirectly) related to that subject, and offers them to the subscriber a recommendations, part of a subscription, and/or for individual purchase.

In some embodiments, the lookback feature may be used with a picture-in-picture (PIP function to display exciting moments from content while a user is viewing another piece of content. For example, a recent exciting clip from a live sporting event may be displayed on a users screen in such a PIP window while the user is watching a concurrent show. This is useful in a variety of circumstances. For instance, the system may be used to ensure that a user sees all the exciting moments of a particular piece of content without viewing the entire program. A user may not want to watch the entirety of an awards show, but may want to receive updates of excitement in near-real-time.

Also, the system may be used to alert a user that a particular piece of content is becoming interesting. For example, an identified fan of a particular sports team may wish to be notified when a game gets interesting. Further, a viewer may be identified as having previously tuned away from a "boring game" and may wish to see clips or tune back if exciting moments are occurring.

The excitement metadata may also be used to control functions other than the generation of clips. In some embodiments, rather than generate a clip for an event, the system may simply tune the display device to the live feed associated with the metadata. For example, a user may be uninterested in a clip comprising an entire sporting event, but may be interested in watching an exciting game currently in progress. Further, if a user tuned away from an event at a particular excitement level, they may wish to be automatically tuned back if the excitement level increases from that particular level (e.g., "delta excitement").

In addition, a user may want to be automatically tuned to any content above a certain threshold of excitement. In these embodiments, conflicts may be resolved by tuning to the most exciting event among a group of events above the threshold, or other defaults or user preferences may dictate a resolution (e.g. always prioritizing a favorite subject of the user or a favorite team/player, etc.) Further, in other variants, an on-screen display option to tune to an exciting game is presented in lieu of automatic tuning. In light of the present disclosure, it can also be appreciated that the system may be used to avoid exciting events (e.g. a user may only find games enjoyable/relaxing when their favorite team has a comfortable lead, and may wish to be warned before tuning to a pitched battle). Anecdotal evidence indicates that those regularly watching exciting sporting events, especially where they have a vested interest or emotional connection to the team(s), actually tends to shorten one's life span. Thus, the system may also direct a user away from an event above a certain threshold of excitement, such as to maintain their peace or in effect extend their life over that which might exist if the events were routinely watched.

In a similar vein, news programming, which frequently and consistently focuses on potentially disturbing events or negative aspects of humanity (e.g., crimes, plane crashes, accidents, etc.) is often equated with inciting depression or other emotional disabilities within people watching them on a routine basis. Hence, metrics similar to "excitement" may be used when evaluating content such as news programs, such as for example a "negativity" index wherein emotionally upsetting stories such as murders or plane crashes are tuned away from, while more positive portions such as weather forecasts or human interest stories are maintained.

Movies for example might use a "suspense/tension" or "hilarity" metric, so as to cue users to (or away from) suspenseful or humorous portions thereof.

Content rules are also considered when providing clips to users. Users lacking the subscription level to view particular piece of content may not be able to view all related clips. However, in some embodiments, highlights below a certain time threshold may still be provided. Further, exciting clips may be used as "teasers" to entice a user to upgrade their subscription level or purchase a specific piece of content.

In other variants, a user may be able to subscribe to an "excitement ticket", where all material highlighted by a specified EIS (or multiple EIS's) is available to that user. In some variants, the ticket is limited to a specific subject (e.g. a certain team or sport, etc.), or may range across multiple different topical areas or genres, Different premiums are charged based on the nature of the specific "tickets".

In yet other variants, the user is charged on a per-clip and/or per-reel basis. Some subscribers may prefer such ala carte availability of clips or reels. Furthermore, the MSO may see wider initial adoption of the service if users are not forced to commit to larger fees allowing repeated use.

Further, such excitement metadata may be used in the assessment of premiums charged to secondary content providers such as advertisers. In some embodiments, content with increased expectation of excitement may garner a higher fee for the insertion of secondary content. Further, given that exciting clips have greater replay likelihood, attaching secondary content to the replays of that clip warrants higher premiums. Excitement metadata may also be used in real-time in this fashion, in an exemplary embodiment, a secondary content source may select a threshold (or thresholds) at which they want to have their content inserted for maximum effect. Even allowing participation in such a targeted secondary content insertion service may warrant a service fee (separate from that associated with actual insertion of secondary content).

Methods and apparatus for the insertion of secondary content and the use of advertising "avails" are discussed in commonly owned U.S. patent application Ser. No. 12/503, 749 filed Jul. 15, 2009, entitled "METHODS AND APPARATUS FOR EVALUATING AN AUDIENCE IN A CONTENT-BASED NETWORK", which issued as U.S. Pat. No. 9,178,634 on Nov. 3, 2015 and is incorporated herein by reference in its entirety. As discussed therein, the identification, creation, and distribution of audience or viewer qualities to an advertisement management system and/or an advertisement decision maker are disclosed. The system provides viewership data in real-time (or near-real time), and offers the ability to monitor audience activities regarding, inter alia, broadcast, VOD, and DVR content. This system advantageously allows the content provider to create more targeted advertising campaigns through use of an algorithm that combines advertising placement opportunities with audience qualifiers (i.e., psychographic, geographic, demographic, characteristic, etc. classifications) to create an advertising "inventory" that can be more readily monetized. In different variants, the inventory can be based on historical and/or "real time" data, such that adverting placements can be conducted dynamically based on prevailing audience characteristics or constituency at that time. Methods and apparatus for managing such advertising inventory via a management system are also discussed.

Referring now to FIG. 7a, a method 700 of generating EIS metadata is shown. This method is useful with, inter alia, the excitement monitoring application described above. However, in light of the disclosure it can be appreciated that a dedicated device or distributed application may also be used.

First, at step 702 of the method 700, an excitement or other metric related to a live feed or piece is assessed. At step 704, it is determined if the assessed metric meets a given threshold criterion or criteria. If the criterion/criteria is/are not met, no metadata is generated. If the criterion/criteria is/are met, metadata is created at step 706. Information identifying the content or feed is added (step 708), and a time-stamp is created (step 710). At step 712, the metadata is passed on to the automated highlight reel system or other system dependent on the excitement or other metadata. Thus, a method for generating metadata related to exciting events is presented.

Referring now to FIG. 7b, a second method 750 of generating EIS metadata is shown. Periodic measurements 752 of an excitement or other metric related to a live feed or piece of content are made. At each interval 754, excitement metadata is generated. The metadata is time-stamped at step 756 of the method 750. Feed or content identifying data is added to the metadata at step 758. At step 760, the metadata is passed to the automated highlight reel system or other system dependent on the excitement metadata. Through this method, periodic updates on the level of excitement related to specific feeds or content are created.

A number of excitement metrics may be implemented consistent with the invention. Simple metrics related to the content may be used. For example, the score of a game is an indicator of excitement. A close game may be more exciting than one with a large differential. However, a record-breaking (or near record-breaking) blowout would be of interest to many users. Thus, interest may be mapped to (i) absolute score; and/or (ii) differential or relative score, but not necessarily in a linear fashion.

Further, lead changes, or changes or large changes in score often indicate excitement. Thus, for example points per unit of time (e.g., excitement "velocity" or even "acceleration") can be also used as an excitement metric. Similarly, the number of times the lead is changed, or the rate at which lead changes occur per unit time (indicating a pitched battle) also indicates excitement. The temporal placement of such changes also may indicate excitement (i.e., lead changes in the first quarter of a game are generally less exciting than those occurring in the fourth quarter, since the latter have more immediate relationship to the final outcome of the game.

The level of noise produced by the crowd (where present) may also indicate excitement. Times of loud cheering or booing indicate excitement. Furthermore, times of unusual silence (or unexpected breaks in cheering) may indicate particularly tense or surprising moments, or at events such as a tennis or golf match, times of intense competition.

At a car race (e.g., Indy 500), vehicle velocity may be an indicator of excitement level. For example, if the cars are averaging 100 mph, it is likely that a crash has occurred, and the yellow flag is out (which can be viewed as potentially exciting for the more morbid person, or less exciting for those interested in high-speed racing and maneuvering).

In some embodiments, the records of teams and/or players are used to predict excitement. For example, if two teams have won and lost to the same or similar teams it is predicted that their own direct matchup will be a close one. This can also be considered in light of their current standings; two teams who have had exciting matches in the past may be considered of less interest if one of the teams has e.g., already locked up a playoff berth, while the other has been excluded from the playoffs.

Similarly, in the field of politics, the news coverage of an election may be of increased excitement if two candidates have been polling similarly in a given region.

In some embodiments, the number of posts (Twitter, Facebook (likes or posts), blog, website comments, etc.) related to specific content are used as a metric. A large absolute number of posts may indicate high levels of interest. However, some embodiments of the invention account for the expected interest in a certain event (i.e., even a "boring" Superbowl will have a large absolute number of posts, or for instance a large money market baseball team will have more expected posts than a smaller market team). Thus, the absolute number of posts is weighted versus an expected number when gauging excitement.

Web crawling applications can be used to collect and assess such posts either from single sources are multiple sources. Further, social media sites (e.g., Facebook and Twitter, etc.) may offer live counts by subject of posts made on their servers.

The subject of posts may be considered in the assessment of posts. Machine plain language learning algorithms can be used to glean data from the posts relating to context. For example, positive posts about certain content may indicate general excitement, and negative posts may indicate an uninteresting game. Further, a mix of positive and negative posts may indicate an unexciting event (i.e., the fans of the winning and losing teams in a blowout), even in the case in which the absolute number of posts is high. Such plain language learning and contextual analysis algorithms are useful in classifying the content of a given post.

Further, in some embodiments, metrics directed by the MSO are used. For example, the users of the MSO's network may be presented with an excitement option (on-screen display option, remote button, soft key, or mobile application, etc.) that allow users to highlight exciting moments in the feeds or content provided by the MSO. When, the user engages the option, the MSO logs the entry. The excitement associated with the clip is associated with the number of such entries. In some variants, the excitement may also be weighed against the total number of viewers. For example if 98% of the active viewers find a feed exciting, a higher excitement rating may be assessed, even in comparison to a feed with a higher absolute number of entries but with only 30% of active viewer responding. It can be appreciated by those of ordinary skill in view of this disclosure, that any number of such "crowd-sourcing" systems to develop aggregate opinions of many users can be applied.

In other embodiments, such excitement options are modified to allow users to create their own custom excitement reels for later viewing and/or sharing with other users. Users may identify start and stop times for individual clips. Then, in an editing application, the user arranges those clips into a reel. The editing program may also provide tools for altering the clips themselves (e.g. changing clip duration, zooming, adding audio or text commentary, cropping, filter effects, etc.). The clips/reels are then stored on a CPE or uploaded to a content server. Uploaded content may be shared with other users, or even more broadly via social media such as Youtube or the like.

In addition, the MSO may maintain fronts on social websites, for example by allowing users to "like" or "follow" particular feeds to indicate interest.

In certain variants of such MSO directed schemes, incentives may be used to increase participation or accuracy. Accuracy may be judged by the total number of times a user identifies a feed or piece of content exciting, versus the number of times enough other users also find that feed or piece of content exciting to exceed the excitement threshold. Honors or discounts may be given to highly active and/or accurate users. For example, if a user is involved in the identification of 100 exciting events, a discount or other incentive on service may be given. Further, in some cases the discount may only be available to users with accuracies above a specific threshold (to discourage "spamming" or random identifications to inflate participation.)

In other variants of such MSO directed schemes, a futures market may be used to predict excitement. Participants supply/purchase a series of "puts" (option to sell) and/or "calls" (option to buy) as to whether specific shows will rise above or fall below a given excitement level. Users then may do background research on various events (e.g. sporting events, political debates, etc.) to gain an advantage over other users while trading and selling these options. This model applies a market-based approach to prediction. Thus, the system leverages potentially extensive individual user research on a large scale. The system may or may not use money, or other forms of consideration/value. In certain variants, the participants trade credits toward subscription expenses rather than actual funds. Yet other variants include a "contest" with point trading rather than money or credits, and the most successful trader(s) (those with highest point totals) may be given consideration (e.g. prizes, discounts, promotions, notoriety, etc.).

Multiple metrics may be combined to increase the accuracy of an assessment. For instance, an anomalous number of posts about a sporting event may simply be a statistical aberration if there is no scoring data of particular interest. Alternatively, one metric may be faulty for a given reason (one would expect muted cheers if the away team wins a game or make great plays, even if the game was exciting.) Thus, monitoring multiple metrics can ensure that over-reliance on particular metric does not occur.

In other embodiments, mathematical analyses are applied to the metrics measured. In models similar to those used in decision making in high-frequency trading, a MSO monitors one or more metrics, and such models are used to predict the likelihood a given trend continues over a given time scale. For example, if one specific minute of an event is found to be exciting, such a model provides probabilities that the next minute will be exciting. Such models may be tailored to time scales ranging from less than one minute up to one month. Functional forms, such as those discussed in "*Scaling of the distribution of fluctuations of financial market indices*" by P. Gopikrishnan, et al., incorporated herein by reference in its entirety, may be used to generate the aforementioned probabilistic models. As discussed therein, power-law asymptotic functions are used to model the temporal distribution of extreme events (such as those associated with high-level of excitement).

It will be appreciated that while the exemplary embodiments of the invention have been discussed primarily in terms of providing content to subscribers, the invention is in no way so limited. The invention may also be applied in other contexts. For example, in the field of sports, when a game is identified as "exciting", it may be the case that the teams are well matched. Thus, coaches/players may be interested in intelligence related to the opposing team. The present invention may be applied to generate a reel of clips useful in such research. For instance, the system may be utilized to automatically create a reel containing every passing play in a given season for a given team (or when a given quarterback was in play). The reel may then be used to identify patterns and weaknesses in the opposing team's strategy. The system may also be used on proprietary content not publically released. For example, the present invention may be applied to camera angles that show the position of every player on a football field. Such camera angles are not generally aired on TV, but the system may be applied to the proprietary archive of an organization, rather than exclusively to content in an MSO's archive. The team may then purchase or receive such reels as a subscription service or on a per reel basis.

As another exemplary application (in the field of politics), a campaign may be interested in highlighting their candidate's best moments (e.g., speeches, town hall meeting, bill passages, leadership in crises, etc.) for an "instant commercial" or other campaign montage, such as for press release, documentary, website post, or advertisements, etc. The present invention may be applied to automatically locate a collection of such clips, and compose them into a highlight reel. The reel may then be purchased by the campaign. In a similar vein, the present invention may also be applied to opposition research. A campaign may be equally interested in a collection of clips that portray their opponent in the worst light (e.g. gaffes, poor past decisions, critical press coverage, etc.) to make an instant negative advertisement.

Further, using the present invention, such reels may be targeted to or composed for individual viewers or subscribers based on their interests or demographic information. For example, a given subscriber may have very specific views on taxes. In this case, the system composes a reel in which every clip relates to the candidate's position/history on taxes. Thus, campaigns may not only purchase premade reels for general release; using the present invention, a service for making and/or delivering targeted advertising may be provided to a campaign. In some such targeted political advertising embodiments, the campaign may supply a collection of content from its own archive for the creation of the highlight reels.

Hence, various aspects of the present invention may be used in virtually any context in which an individual or group is in interested in a "highlight" (or lowlight) reel or other montage of contextually related media. For example, event planners often require such highlight reels for social events (company meetings, conventions, birthdays, concerts, etc.). Reels for these events may be made on a contractual basis, or simply compiled and then made available for purchase. These reels may be created from a content archive maintained by an MSO, or from a private library maintained by the recipient or third party. For example, cloud or online video/picture upload sites may use the present invention to offer their users instant highlight reels from the uploaded content stored on the site.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A content server apparatus operative to generate content having a particular attribute for delivery over a content distribution network, said apparatus comprising:
   a storage device;
   a plurality of interfaces configured to:
     receive one or more feeds from one or more content sources;
     receive one or more secondary content elements from a secondary content source; and
     transmit a content stream to a target device; and
   a processing entity in data communication with said plurality of interfaces and said storage device, said processing entity configured to run an application thereon, said application comprising a plurality of instructions configured to, when executed:
     record a portion of said one or more feeds;
     store said portion on said storage device;

compare time data present within metadata corresponding to a level of excitement to a time associated with said recorded portion;

based on said comparison, associate said metadata corresponding to said level of excitement with said recorded portion of said one or more feeds;

determine whether said level of excitement meets or exceeds a threshold, said threshold being selected by said secondary content source; and in response to said determination that said threshold selected by said secondary content source is met or exceeded:

assess a premium to charge to said secondary content source; and add said recorded portion and at least one of said one or more secondary content elements to said content stream.

2. The content server apparatus of claim 1, wherein said determination comprises an extraction of a value configured to indicate a likelihood that said recorded portion possesses said particular attribute.

3. The content server apparatus of claim 2, wherein said particular attribute comprises excitement.

4. The content server apparatus of claim 1, wherein said target device comprises a mobile wireless device.

5. The content server apparatus of claim 1, wherein said content stream comprises a video-on-demand (VoD) session.

6. A method for identification of exciting content in a content delivery network, said method comprising:

measuring, by a first server, an excitement metric exhibited by a plurality of viewers for at least a first portion of an event;

in response to determining that said excitement metric indicates an excitement level of said first portion of said event as meeting or exceeding a predetermined threshold:

generating metadata describing said event;

associating said metadata to a recorded version of said first portion of said event;

comparing said associated metadata to at least user preferences of at least one user; and based at least in part on said comparing, classifying said recorded version of said first portion into one or more classifications; and generating a playlist comprising said recorded version of said first portion and recorded versions of at least one of: (i) other portions of said event, or (ii) portions of different events;

wherein said respective excitement levels of said other portions of said event and said portions of different events are indicated as meeting or exceeding said predetermined threshold; and wherein said recorded versions of other portions of said event and said portions of different events share said one or more classifications with said recorded version of said first portion.

7. The method of claim 6, wherein said excitement metric comprises an acoustic metric associated with noise generated by a crowd.

8. The method of claim 6, wherein said excitement metric comprises at least one of a score differential or a point differential.

9. The method of claim 6, wherein said excitement metric comprises a total number of posts on a social media website.

10. The method of claim 6, further comprising delivering said playlist to said user, wherein said playlist is configured to be displayed in a picture-in-picture (PIP) window.

11. A content server apparatus operative to generate content having a particular attribute, said apparatus comprising:

a storage device;

at least one interfaces configured to receive one or more feeds from one or more content sources; and a processing entity in data communication with said plurality of interfaces and said storage device, said processing entity configured to run an application thereon, said application comprising a plurality of instructions configured to, when executed:

monitor an excitement metric associated with one or more streams currently being delivered to a target device, said excitement metric exhibited by a plurality of viewers;

record a portion of said one or more feeds;

store said portion on said storage device;

compare time data present within metadata corresponding to a level of excitement to a time associated with said recorded portion;

based on said comparison, associate said metadata corresponding to said level of excitement with said recorded portion of said one or more feeds;

determine, based on said monitored excitement metric, whether an excitement level threshold is met for said recorded portion of said one or more feeds;

in response to (i) a first determination that said excitement metric indicates that said one or more streams is below said excitement level threshold and (ii) a second determination that said excitement level threshold is met for said recorded portion of said one or more feeds, cause said target device to display said recorded portion of said one or more feeds; and in response to a third determination that said excitement metric indicates that said one or more streams is at or above said excitement level threshold, present said target device with an on-screen display option, said on-screen display option configured to allow said target device to switch from said display of said recorded portion of said one or more feeds to said display of said one or more streams.

12. The content server apparatus of claim 11, wherein said determination of whether said excitement level threshold is met for said recorded portion of said one or more feeds comprises an extraction of a value configured to indicate a likelihood that said recorded portion possesses said particular attribute.

13. The content server apparatus of claim 12, wherein said particular attribute comprises excitement.

14. The content server apparatus of claim 11, wherein said target device comprises a mobile wireless device.

15. The content server apparatus of claim 11, wherein said one or more streams comprises a video-on-demand (VoD) session.

16. The content server apparatus of claim 11, wherein said recorded portion of said one or more feeds is configured to be displayed on said target device in a picture-in-picture (PIP) window.

* * * * *